| 
US007825822B2

(12) United States Patent
Hornsby et al.

(10) Patent No.: US 7,825,822 B2
(45) Date of Patent: Nov. 2, 2010

(54) SYSTEM AND METHOD FOR EXTRACTING AND CONVEYING MODULATED AC SIGNAL INFORMATION

(75) Inventors: James Russell Hornsby, St. Louis, MO (US); Marcellus Rambo Benson, Chesterfield, MO (US); James Augustus Keefe, III, O'Fallon, MO (US); Joseph Lee McGowan, St. Charles, MO (US); Ashley B. Hornsby, Clayton, MO (US)

(73) Assignee: Cepia, LLC, St. Louis, MO (US)

( * ) Notice: Subject to any disclaimer, the term of this patent is extended or adjusted under 35 U.S.C. 154(b) by 1165 days.

(21) Appl. No.: 11/389,883

(22) Filed: Mar. 27, 2006

(65) Prior Publication Data
US 2006/0262529 A1 Nov. 23, 2006

Related U.S. Application Data

(63) Continuation-in-part of application No. 11/327,159, filed on Jan. 6, 2006, now Pat. No. 7,520,633.

(60) Provisional application No. 60/667,858, filed on Apr. 1, 2005.

(51) Int. Cl.
*G08B 5/00* (2006.01)
(52) U.S. Cl. .............................. 340/815.46; 340/310.12; 340/538.11; 340/538; 340/310.11; 340/538.12; 340/538.15; 340/310.13; 340/310.16
(58) Field of Classification Search ............ 340/815.46, 340/310.12, 538.11, 538.17, 568.3, 538, 340/310.11, 538.12, 538.15, 310.13, 310.16, 340/286.02; 375/272, 302
See application file for complete search history.

(56) References Cited

U.S. PATENT DOCUMENTS 3,568,144 A 3/1971 Streb (Continued)

FOREIGN PATENT DOCUMENTS

DE 199 41 589 A1 8/2000

(Continued)

OTHER PUBLICATIONS

Vitta Rao, "Two LEDs Blend and Blink to Indicate Six States", Electronic Design, vol. 30, No. 16, Aug. 5, 1982, p. 220.

(Continued)

*Primary Examiner*—Daryl Pope
(74) *Attorney, Agent, or Firm*—Dorsey & Whitney LLP

(57) ABSTRACT

An economical system and method for extracting amplitude and frequency information from a modulated AC signal are provided. In one embodiment, the invention includes a circuitry implementing op amps, a dual diode, a filter, and a comparator to receive and manipulate the modulated AC signal. The dual diode receives and splits the AC signal into two separate paths, including a baseline path and a filtering path. The AC signal passing through the baseline path remains substantially unchanged, and the AC signal passing through the filtering path passes through a low-pass filter. The signal is then sent through a comparator for comparing amplitudes of the AC signal from the two paths, and the comparator output is received by a microprocessor for controlling a display that generates a visual indicia responsive to the comparator output.

10 Claims, 21 Drawing Sheets

U.S. PATENT DOCUMENTS

| | | | |
|---|---|---|---|
| 3,651,458 A * | 3/1972 | Reynolds et al. | 714/807 |
| 4,327,319 A * | 4/1982 | Swisher et al. | 323/303 |
| 4,359,601 A | 11/1982 | England | |
| 4,468,792 A * | 8/1984 | Baker et al. | 375/272 |
| 4,480,294 A | 10/1984 | Carboni | |
| 4,768,086 A | 8/1988 | Paist | |
| 4,972,533 A | 11/1990 | Brown | |
| 5,316,293 A | 5/1994 | Hamilton | |
| 5,376,245 A * | 12/1994 | McLeod | 204/155 |
| 5,400,230 A | 3/1995 | Nicoletti | |
| 5,499,189 A * | 3/1996 | Seitz | 700/286 |
| 5,594,384 A | 1/1997 | Carroll et al. | |
| 5,610,451 A * | 3/1997 | Symonds | 307/66 |
| 5,947,789 A | 9/1999 | Chan | |
| 5,961,201 A | 10/1999 | Gismondi | |
| 6,095,661 A | 8/2000 | Lebens et al. | |
| 6,241,362 B1 | 6/2001 | Morrison | |
| 6,311,350 B1 | 11/2001 | Kaiserman et al. | |
| 6,746,131 B1 | 6/2004 | Goldstein et al. | |
| 6,788,011 B2 | 9/2004 | Mueller et al. | |
| 6,888,322 B2 | 5/2005 | Dowling et al. | |
| 7,258,463 B2 | 8/2007 | Sloan et al. | |
| 2002/0017879 A1 | 2/2002 | Denny et al. | |
| 2003/0178960 A1 * | 9/2003 | Kassing | 318/430 |
| 2004/0067713 A1 | 4/2004 | Fong | |
| 2004/0067714 A1 | 4/2004 | Fong | |

FOREIGN PATENT DOCUMENTS

| | | |
|---|---|---|
| EP | 0328358 A2 | 8/1989 |
| EP | 0494310 A1 | 7/1992 |
| EP | 0 959 297 A | 11/1999 |
| EP | 1 435 483 A | 7/2004 |
| GB | 2288903 A | 1/1995 |
| GB | 2349942 A | 11/2000 |
| JP | 6215750 A | 1/1987 |
| JP | 756523 A | 3/1995 |
| JP | 831213 A | 2/1996 |
| JP | 10123591 A | 5/1998 |
| JP | 200322012 A | 11/2000 |
| WO | 91/19278 | 12/1991 |
| WO | 01/90828 | 11/2001 |
| WO | 02/21432 | 3/2002 |

OTHER PUBLICATIONS

"Sound-to-light Unit Effects on a Budget", by K Walraven, *Elektor Electronics*, Tunbridge Wells, GB, vol. 22, No. 246, Jul. 1, 1996, pp. 78-81, 83.

Walraven K., "Sound-to-Light Unit Light Effects on a Buget", Elektor Electronics, Tunbrige Wells, GB, Jul. 1, 1996, pp. 78-81, 83, vol. 22, No. 246.

* cited by examiner

RGB Light Box

RGB Tower

Example of simple ramp pattern

SYSTEM AND METHOD FOR EXTRACTING AND CONVEYING MODULATED AC SIGNAL INFORMATION

CROSS-REFERENCE TO RELATED APPLICATION(S)

This application is a continuation-in-part of prior application Ser. No. 11/327,159, filed Jan. 6, 2006, which claims the benefit of U.S. Provisional Application No. 60/667,858, filed Apr. 1, 2005, the contents of which are incorporated herein by reference in their entirety.

FIELD OF THE INVENTION

The present invention relates to systems and methods that can be implemented to extract amplitude and frequency information from a modulated AC signal, and subsequently convey that information. The information may be conveyed visually through a lighting and display system and method.

BRIEF SUMMARY OF THE INVENTION

The present invention provides a cost-effective system and method for extracting information from a modulated AC signal, such as an NTSC video signal or an audio signal. The invention further provides for a system and method for visually displaying the extracted information in a manner that is aesthetically pleasing.

In one embodiment, the system and method include a circuitry implementing op amps, a dual diode, a filter, and a comparator to receive and manipulate the modulated AC signal. The dual diode receives and splits the AC signal into two separate paths, including a baseline path and a filtering path. The AC signal passing through the baseline path remains substantially unchanged, and the AC signal passing through the filtering path passes through a low-pass filter. The signal is then sent through a comparator for comparing amplitudes of the AC signal from the two paths, and the comparator output is received by a microprocessor for controlling a display that generates a visual indicia responsive to the comparator output.

Where the AC signal is an NTSC video signal the extracted information may included the signal amplitude, which represents brightness or luminance, or frequency, represents color or chrominance. Where the AC signal is an audio signal the extracted information may included amplitude, which represents volume, or frequency, which represents pitch.

The microprocessor may be interfaced with RGB-nodes to convey the information visually with light. The desired AC signal information is thereby communicated to the microprocessor, which in turn drives at least one set of associated RGB nodes to change color in direct response to the signal. In one embodiment, the AC signal is an audio signal and the RGB nodes are configured linearly such that the resultant effect is like a "graphic equalizer display" function. The ensuing large scale effect, which directly correlates a modulated AC signal to a visual display, is thereby achieved without significant analog processing on the front end or expensive display technologies on the back end. There are a variety of applications for such a visual display, including installation in decorative objects, for example, speaker grills, wall hangings, panel-like displays, and any other functional or non-functional objects. This system and method of extracting and conveying modulated AC signal information is provided in an economical manner not previously available.

DETAILED DESCRIPTION

Lighting Display with Associated Light Modules

The present invention comprises novel and advantageous lighting and display apparatus, systems and methods. As discussed in one embodiment herein, the lighting system of the present invention is integrated into a pillow. However, according to alternative embodiments and without limitation, the lighting system can be integrated or implemented into bedding, plush figures, such as a teddy bear, rugs, articles of clothing, furniture, inflatable items (including for example inflatable furniture, toys, figures, sports equipment, tents, outdoor play sets), lamps, lanterns, dispensing devices, clocks, wall décor, desk accessories, CD racks, home décor, other home products, other office products, or any products for which a lighting system in accordance with the present invention would be useful or desirable. Examples of some of these and other aspects or embodiments of the present invention are depicted in FIGS. 3-7, and in FIGS. 12-15, which show some of the colors, color combinations, illumination, progressions, intensities, and/or patterns that can be displayed, created or produced in accordance with the present invention.

With regard to fastening, mounting, attaching or connecting the components of devices of the present invention, unless specifically described as otherwise, conventional fasteners such as screws, rivets, toggles, pins and the like may be used. Other fastening or attachment means appropriate for connecting components include friction fitting, adhesives, welding and soldering, the latter particularly with regard to electrical or processing components or systems of the devices. Any suitable electronic, electrical, communication, computer or processing components may be used, including any suitable electrical components and circuitry, light sources, wires, wireless components, sensors, chips, boards, micro-processing or control system components, software, firmware, hardware, etc.

Figure 1:
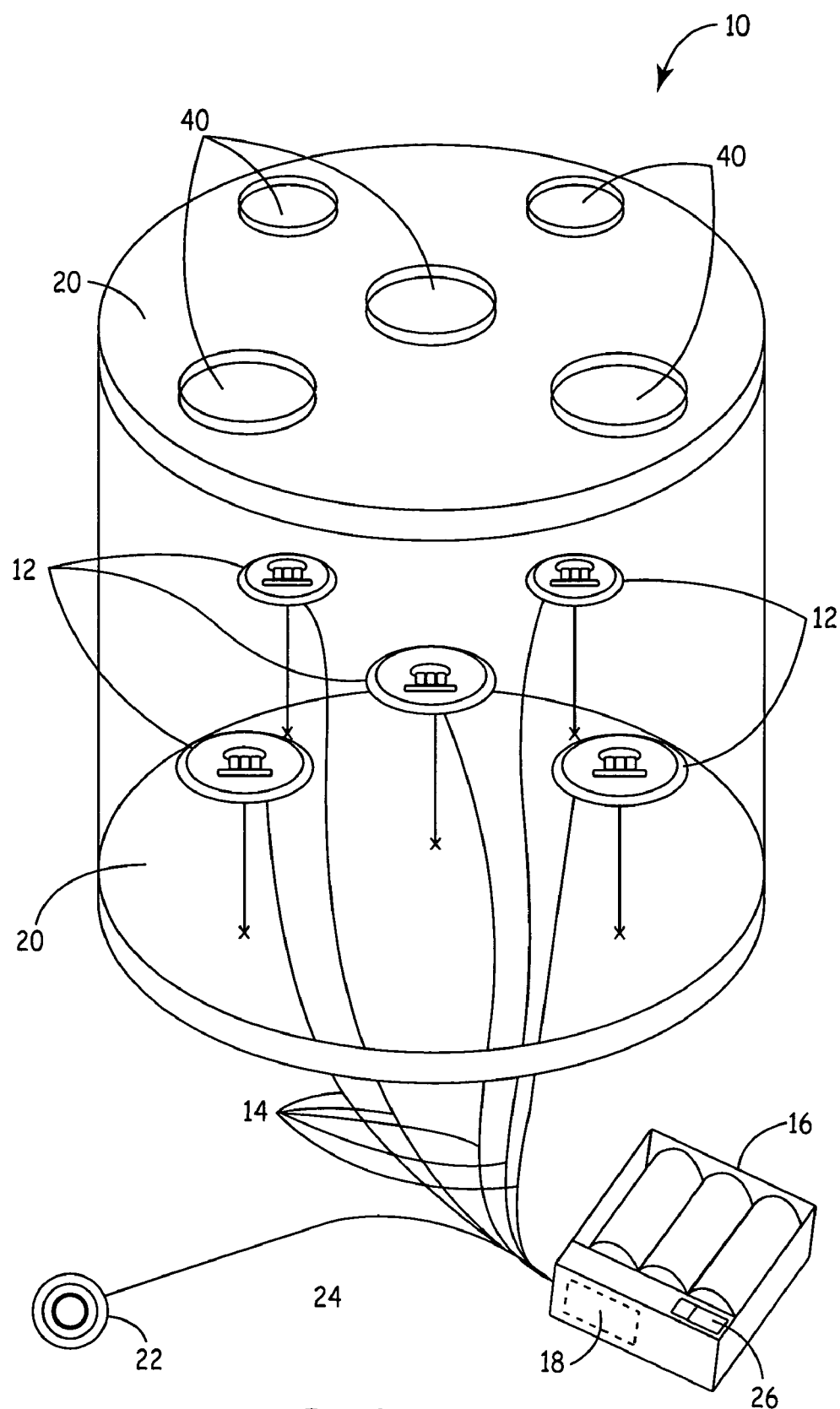
FIG. 1 is a schematic drawing of the lighting system of the present invention.
Figure 8:
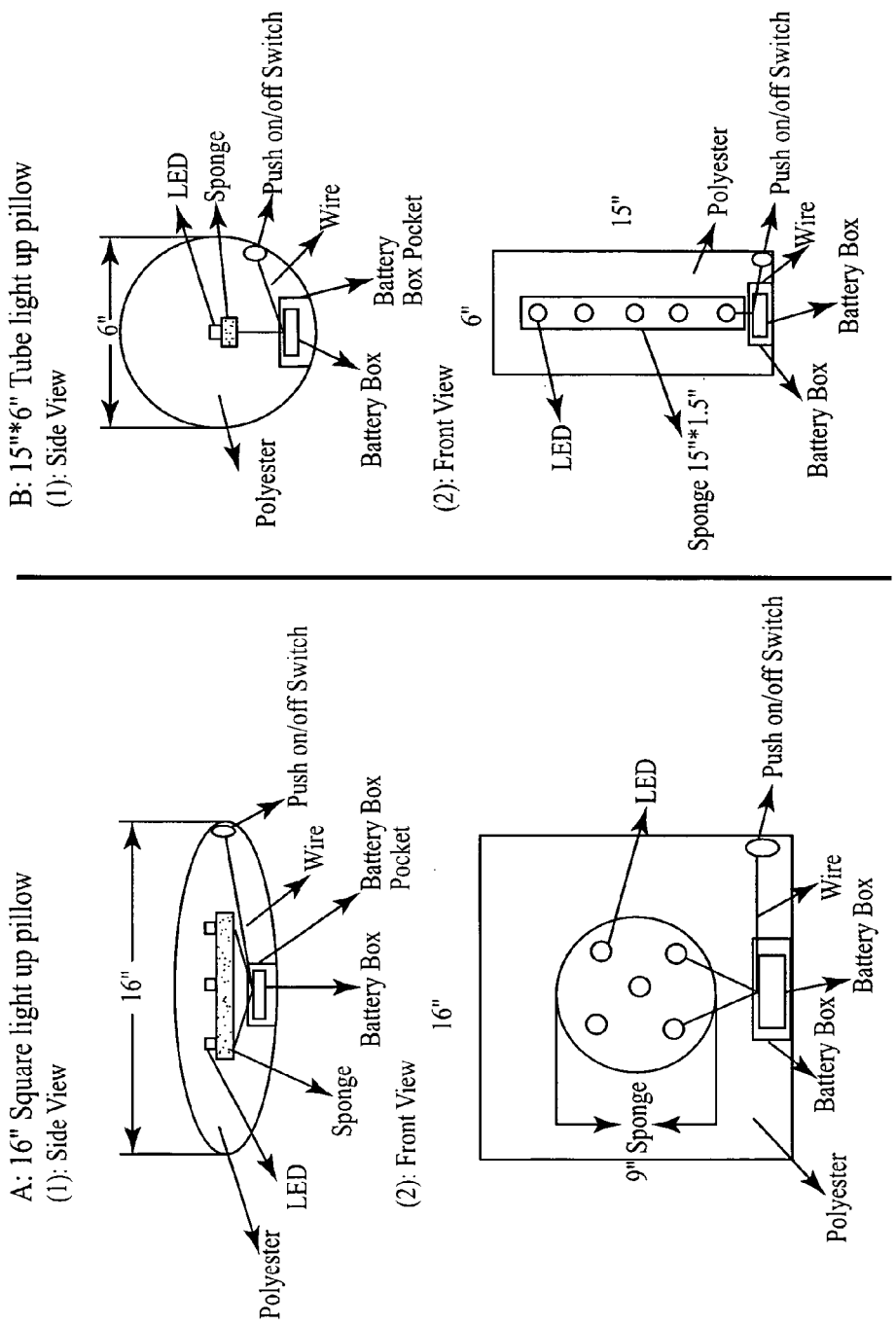
FIG. 8 is schematic views of embodiments of the lighting system of the present invention as used in pillows.

FIG. 1 depicts a schematic drawing of a lighting system 10 in a pillow according to one embodiment of present invention. The system includes light modules 12 connected by wires 14 to a power source 16 and a CPU 18. The modules 12 are disposed between two layers of cushioned material 20. As depicted in FIG. 1, the CPU 18 is an integrated circuit that is integrated into the power source 16. Alternatively, the CPU is a separate component. An activation switch 22 that can activate and de-activate (or turn "on" and "off") the system 10 is connected by a wire 24 to the power source 16. Further, a slide activation or other suitable switch 26 that can activate, de-activate, or test the system 10 is integrated into the power source 16. Alternatively, the slide activation switch 26 is a separate component. FIG. 8 depicts additional exemplary embodiments of the present invention as used in pillows.

Figure 2A:
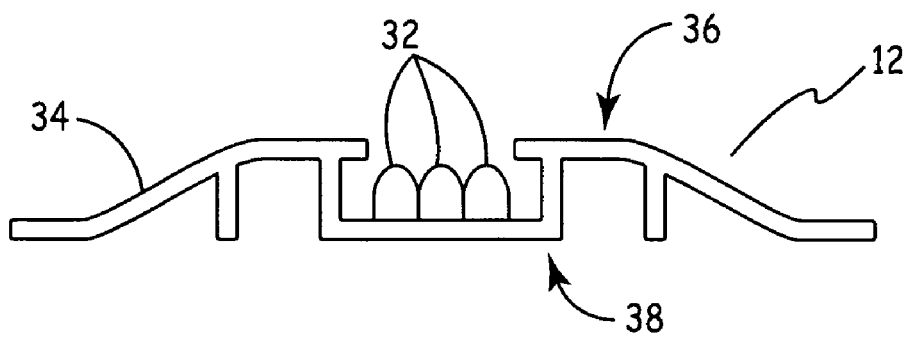
FIG. 2A is a cutaway profile view of a light module of the present invention.
Figure 2B:
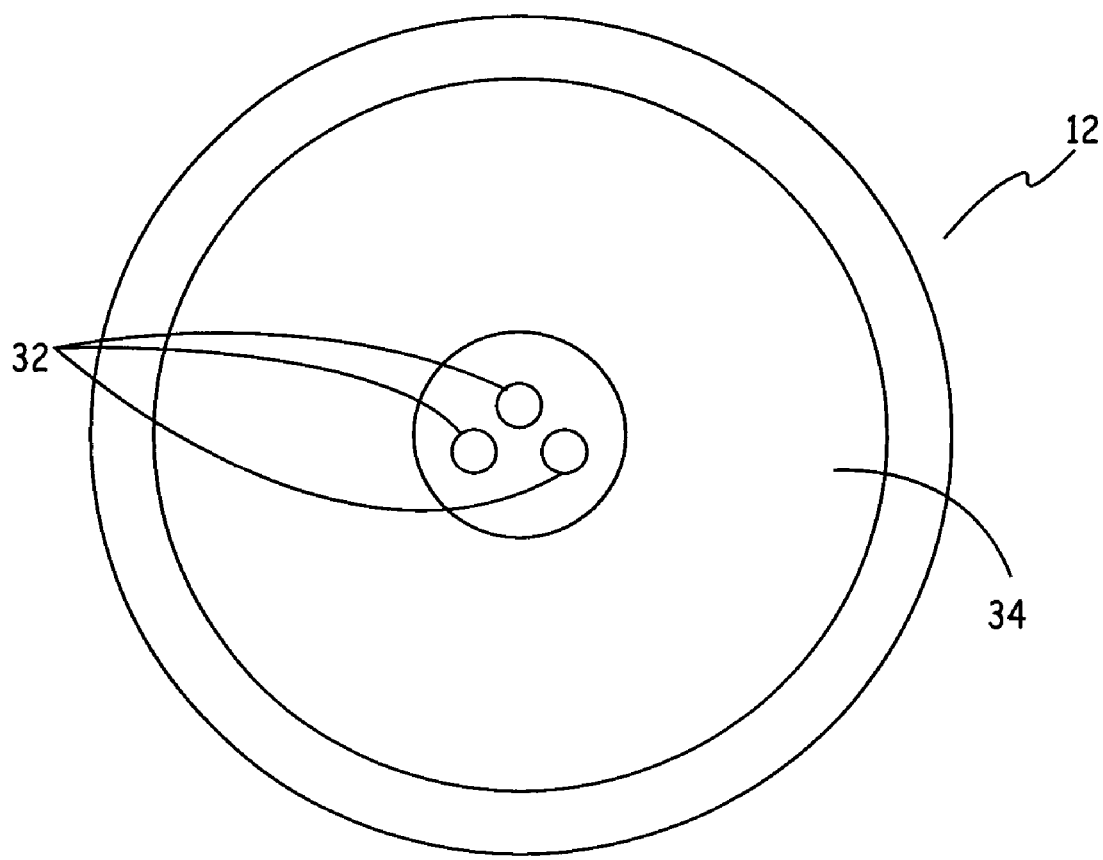
FIG. 2B is a top view of a light module of the present invention.
Figure 3:
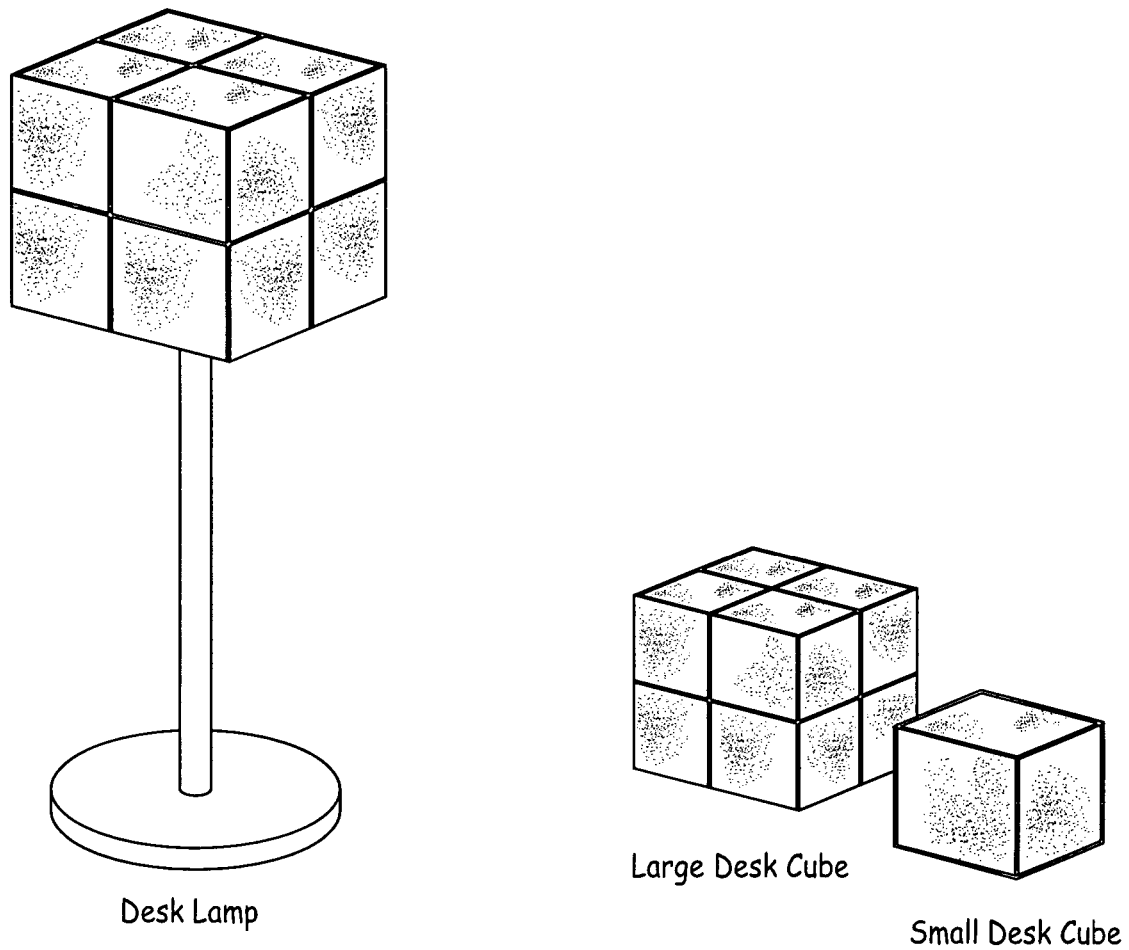
FIG. 3 is a perspective view of one embodiment of the lighting system of the present invention as used in desk lamps.
Figure 4:
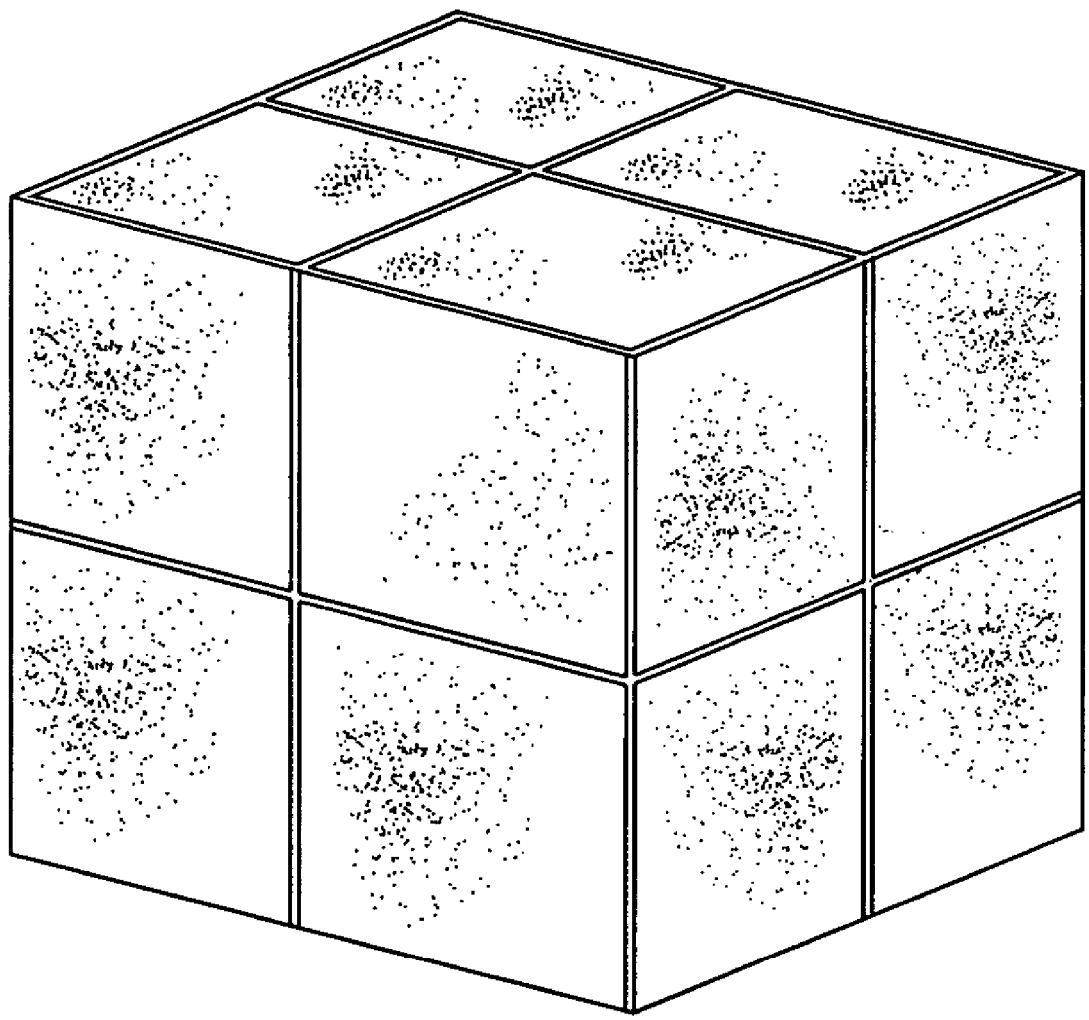
FIG. 4 is a perspective view of one embodiment of the lighting system of the present invention as used in a light cube.
Figure 5:
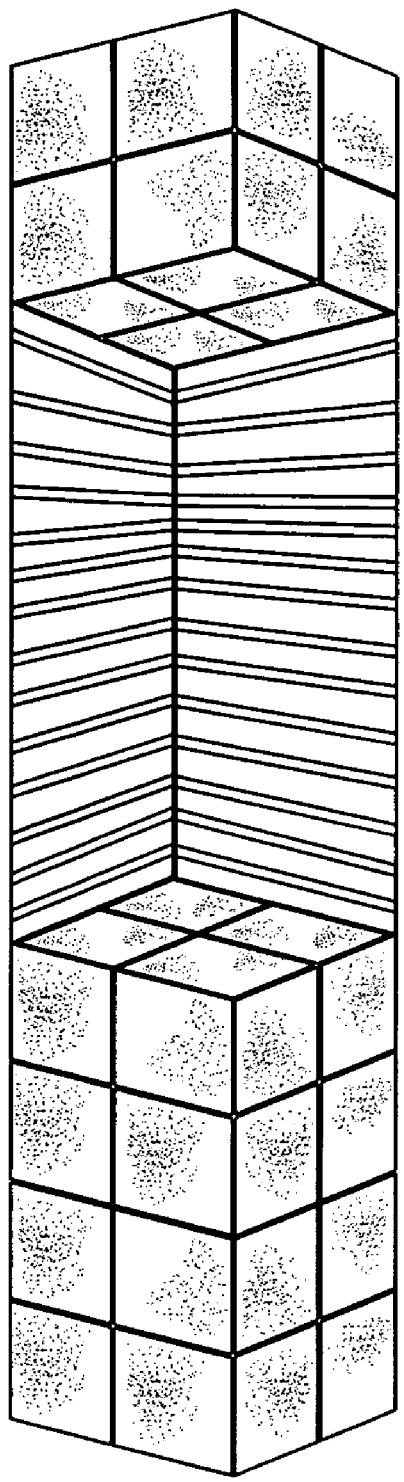
FIG. 5 is a perspective view of one embodiment of the lighting system of the present invention as used in a CD tower.
Figure 6:
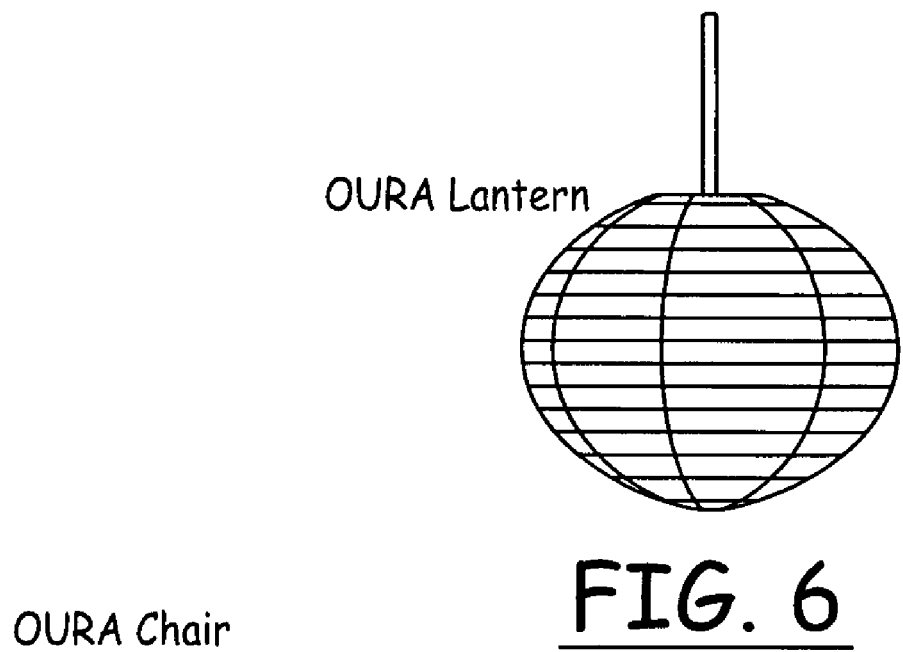
FIG. 6 is a perspective view of one embodiment of the lighting system of the present invention as used in a lantern.
Figure 7:
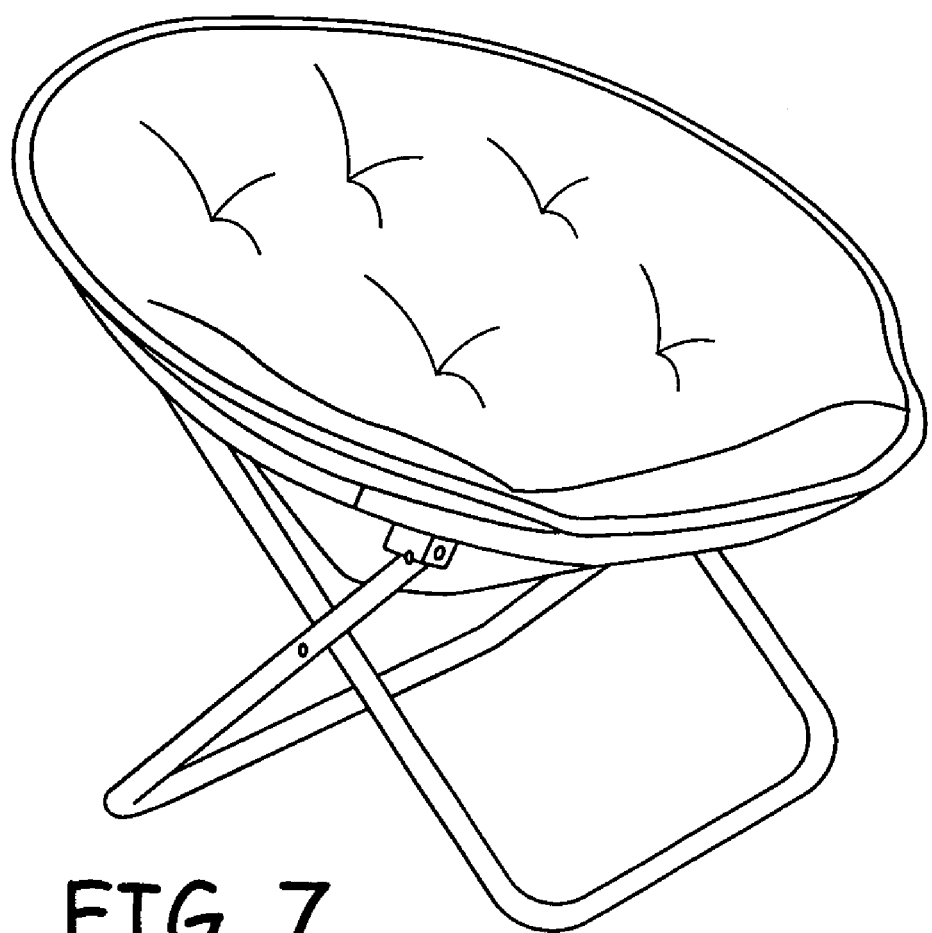
FIG. 7 is a perspective view of one embodiment of the lighting system of the present invention as used in a chair.

A cutaway profile view of a light module 12 in accordance with one aspect of the present invention is depicted in FIG. 2A. FIG. 2B shows a top view of a light module 12 in accordance with the present invention. The light module 12 has three lights or light sources 32 emitting different colors. According to one embodiment, each light 32 is a light emitting diode ("LED"). The three lights are red, green, and blue, respectively. Thus, a light module 12 may have four connections: one control line for each of the LEDs and one line for either power or ground. In an alternative aspect of the present invention, each module 12 may have more than three lights 32.

The module 12 has a cover component 34 that is positioned on a top portion 36 of the module 12. In one aspect of the invention, the cover component is a circular piece with a hole 36 in the center that is positioned above the lights 32 as shown in FIG. 2A so that the light from the lights 32 can pass through the hole 36. The cover component 34 is made of a soft material that provides protection to the lights 32 while allowing the pillow into which the system 10 is integrated to be used without the user detecting by physical touch the presence of the modules 12 in the pillow. In one embodiment, the cover component 34 is made of soft polyvinyl chloride ("PVC"). Alternatively, the cover component can be made of any known material.

Returning to FIG. 1, the cushioned material layers 20 are made of foam. Alternatively, the cushioned material layers 20 are made of any known soft or cushioned material. The modules 12 are sandwiched between the two cushioned material layers 20. A bottom portion 38 of each module 12 as shown in FIG. 2A is placed in contact with the bottom cushioned layer 20 and the top cushioned layer 20 is then placed on top of the bottom cushioned layer 20 and the modules 12. In one embodiment, each module 12 is glued or attached in some other known fashion to the bottom cushioned layer 20 and a hole 40 is formed in the top cushioned layer 20 for each module 12 such that when the top cushioned layer 20 is placed on top of the bottom cushioned layer 20 and the modules 12, each module 12 is positioned in one of the holes 40 of the top cushioned layer 20. While form may be used in some applications or systems, there are situations in which foam or cushioning is not required. For example, the present invention may be used to create a display in a hollow body with generally or substantially rigid sides (see, e.g., FIG. 3) or a hollow fixture such as a paper lantern (see, e.g., FIG. 6). It should be appreciated that the effect of a display in accordance with the present invention may be modified or enhanced by selecting a particular light transferring or diffusing material for one or more surfaces or component materials of the article containing a light module 12. Similarly, the article could use a reflective component to direct or modify the illumination of the display.

Figure 18:
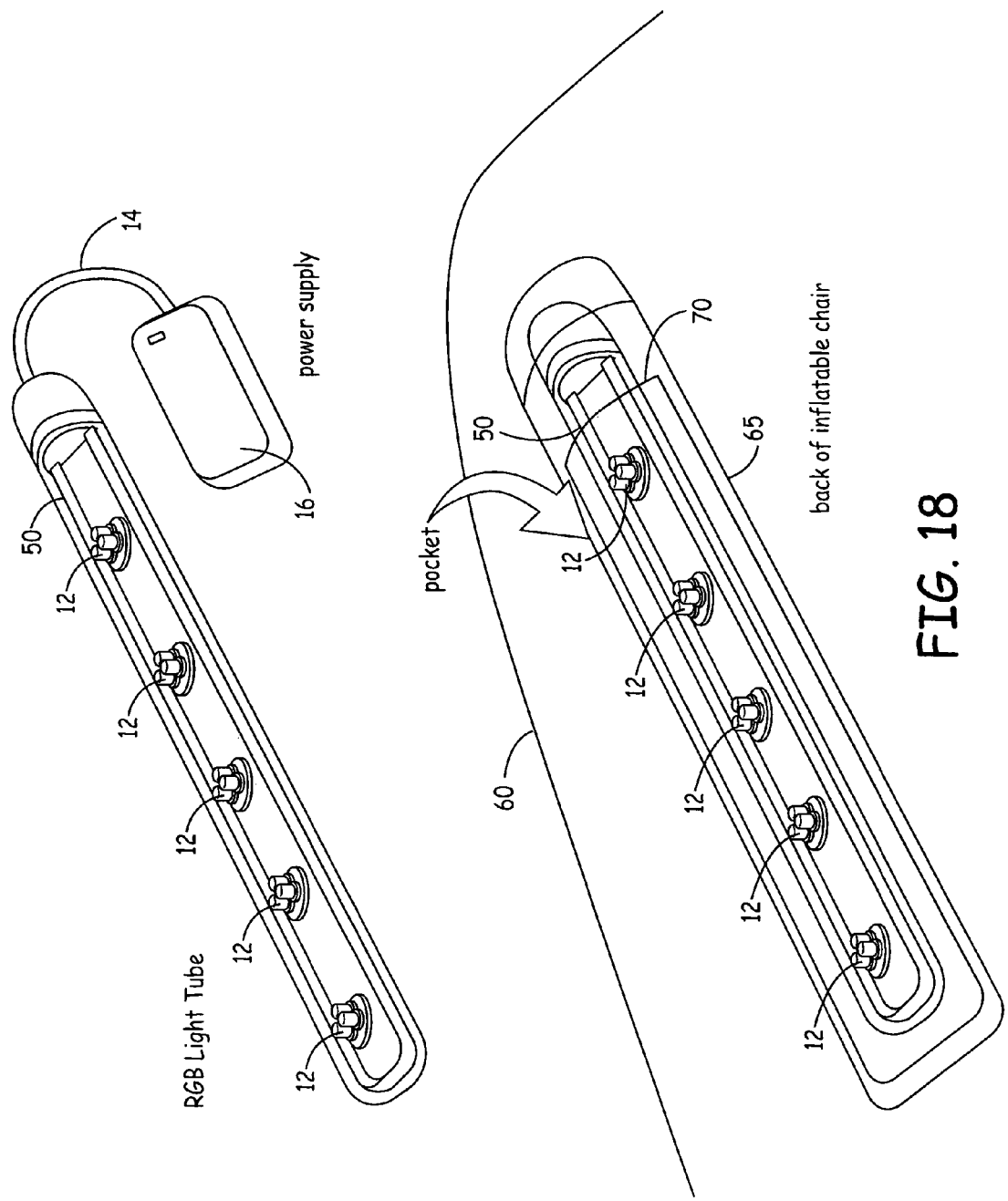
FIG. 18A is a sealed tube configured to house a plurality of LED light modules.
FIG. 18B is the sealed tube of FIG. 18A arranged in a piece of inflatable furniture.

In an alternative embodiment, rather than sandwiching modules 12 between two cushioned material layers 20 as seen in FIG. 1, a plurality of light modules 12 may be configured in a sealed wand or tube 50 as seen in FIG. 18A. The number of modules 12 arranged in tube 50 will depend on the desired lighting effect. Sealed tube 50 may be formed of substantially transparent or translucent plastic or other suitable material and may be designed as a waterproof enclosure if desired for a particular application. The light modules 12 are securely attached to and within tube 50 and may be arranged in a row, multiple rows, or other configuration. A plurality of design arrangement of the light modules 12 may be configured within a tube. Accordingly, tubes 50 may be manufactured and the light module 12 layout may subsequently be designed and implemented, thereby separating the manufacturing process and the assembly process, resulting in cost savings.

With reference to FIGS. 1 and 18A, the power source 16 is a battery power source and is in electrical connection with modules 12 via wires 14. The power source 16 requires three "AA" batteries. Alternatively, the power source 16 may comprise any number of any type of battery. In further alternatives, the power source is a wall outlet, an AC transformer, a car lighter, any other power source or combination thereof. The power source 16 may be formed as a waterproof enclosure if desired for a particular application.

The wires 14 and 24 are typical electrical wires used for battery powered items. Alternatively, the wires 14, 24 can be any suitable electrical wires appropriate for an electrically-powered item. In some embodiments, all or a portion of the system 10 may incorporate suitable wireless technology. For example, a suitable wireless remote may be used to turn the system 10 on or off or to select a particular mode of operation.

The activation switch 22 sends a command to the IC control unit, e.g., on, off, or is a switch that simply completes the circuit (i.e., in some embodiments, it may not communicate with the IC controller). The slide activation switch 26 is a mode switch. It sets the device, apparatus or system to a predetermined operational mode, such as on, off, "try-me," etc. The apparatus 10 can include any other known activation component such as, for example, a shake sensor, remote switching assembly, a thermal sensor, a light sensor, or a sound sensor.

The CPU 18 is an integrated circuit that controls the operation of the lights 32 in each of the modules 12. That is, the integrated circuit controls which lights 32 are activated at any given time and the duration of that activation. It is the integrated circuit that controls any lighting pattern of the apparatus 10 as described above. While an integrated circuit is depicted, it should be appreciated that any suitable controller or control unit may be used to control the functions, appearance and operations of the present invention.

Lighting System with Microcontroller in Operation

Figure 9A:
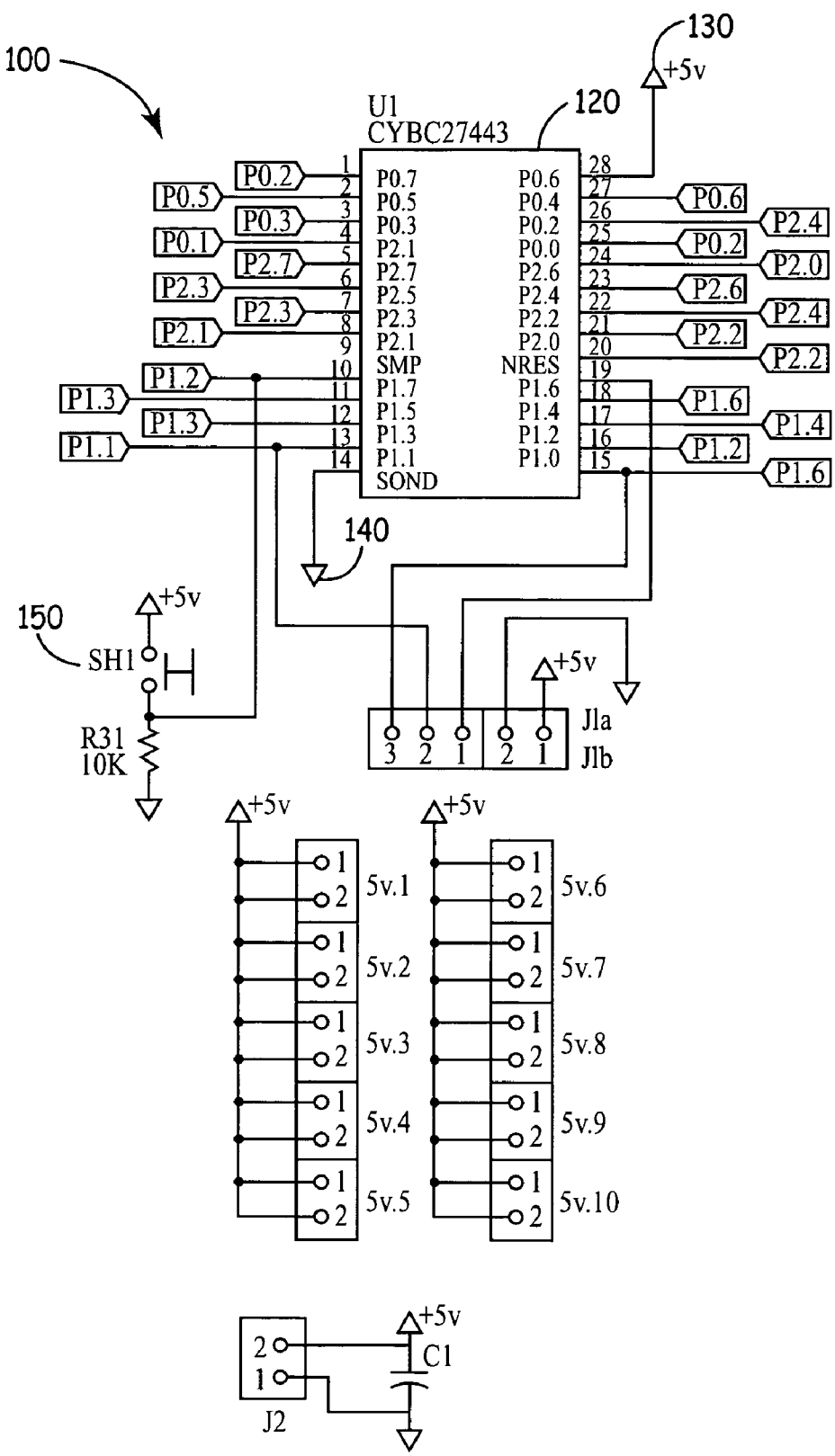
FIG. 9A is a schematic diagram of an exemplary lighting system of the present invention.
Figure 9B:
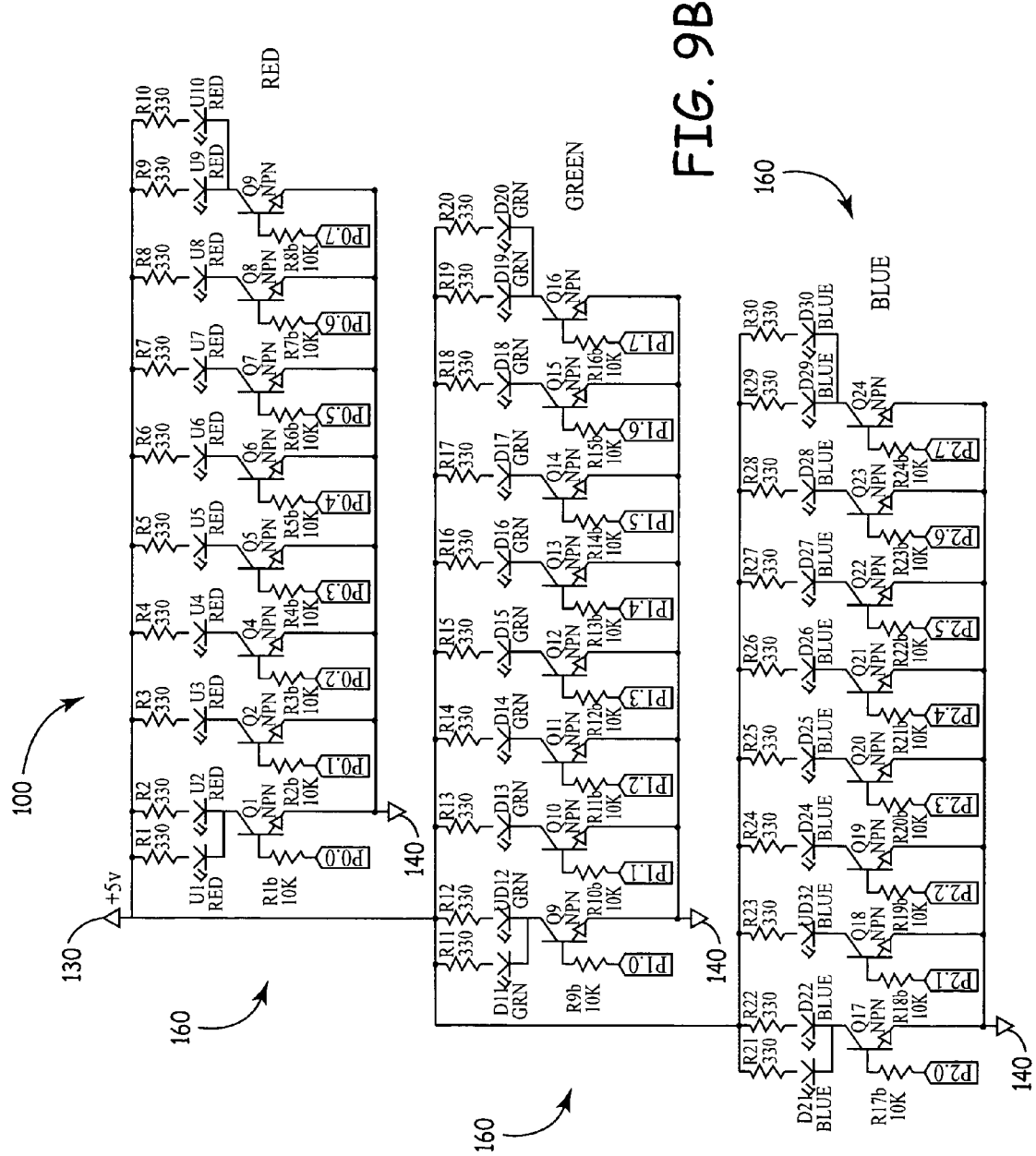
FIG. 9B is a schematic diagram of LED arrays of an exemplary lighting system of the present invention.

FIGS. 9A and 9B are schematic diagrams of an exemplary lighting system 100 in accordance with an embodiment of the present invention. The lighting system includes a microcontroller 120, or other appropriate integrated circuit, that controls LED arrays 160. Pin 28 of microcontroller 120 is in electrical connection with a voltage supply 130 (not shown), pin 14 of microcontroller is in electrical connection with ground connection 140, and microcontroller 120 is in electrical connection with switch 150, which is configurable by a user to open and close the circuit as desired. Appendix A of this application illustrates exemplary RAM requirements for a microcontroller used in one embodiment of the present invention.

With reference to FIG. 9B, LED arrays 160, which are controlled by microcontroller 120, include ten red LEDs D1-D10, ten green LEDs D11-D20, and ten blue LEDs D21-D30. Each LED array 160 is connected in parallel to voltage supply 130 and ground connection 140 as seen in FIG. 9B. Between the voltage supply 130 and the LEDs are 330 Ohm resistors R1-R10 for LEDs D1-D10 respectively, resistors R11-R20 for LEDs D11-D20 respectively, and resistors R21-R30 for LEDs D21-D30 respectively. Each array also includes a plurality of transistors, configured as seen in FIG. 9B, including transistors Q1-Q8 connected with the red LEDs' collectors, transistors Q9-Q16 connected with the green LEDs' collectors, and Q17-Q24 connected with the blue LEDs' collectors as shown in FIG. 9B. Each transistor's emitter is connected to ground 140, and each transistor's base is connected to the microcontroller's connecting pins, with a 10 kOhm resistor therebetween (resistors R1b-R8b for transistors Q1-Q8 respectively, resistors R9b-R16b for transistors Q9-Q16 respectively, and resistors R17b-R24b for transistors Q17-Q24 respectively). As seen in FIGS. 9A and 9B, microcontroller's 120 pins 1-4 and 24-27 are in electrical connection with resistors R1b-R8b for controlling the red array, microcontroller's 120 pins 10-13 and 15-18 are in electrical connection with resistors R9b-R16b for controlling the green array, and microcontroller's 120 pins 5-8 and 20-23 are in electrical connection with resistors R17b-R24b for controlling the blue array.

In this configuration of exemplary lighting system 100, the transistors, the operation of which is well known in the art, function as switches that allow microcontroller 120 to control each LED in the array 160 individually. The physical LEDs D1-D10 (red), D11-D20 (green), and D21-D30 (blue) respectively, are situated in close proximity, such that microcontroller 120 can create any desired color, at a desired time, and for a desired duration, by managing the intensity of the current across each transistor in a light module (e.g., light module [D1, D11, D21], light module [D2, D12, D22], light module [D3, D13, D23], etc.). Lighting system 100 is configurable in products similarly as lighting system 10. Whereas lighting system 10 includes a light module 12 embedded in a pillow and is controlled by CPU 18, similarly, lighting system 100 includes a plurality of light modules formed from LEDs D1-D10, D11-D20, and D21-D30, that are controlled by microcontroller 120.

In one embodiment, the LEDs are driven at either full on or full off. The amount of light emitted by an LED is controlled by varying the amount of time that the LED is switched on over the course of a fixed period of time, commonly referred to as "pulse width modulation." In this embodiment, it is critical that the pulse width modulation period is short enough so that the LED switches between on and off faster than the human eye can detect. For example, a period of 50 μS should be more than sufficient to be imperceptible to the human eye.

In one embodiment of the present invention, the light modules 12 are organized in groups of eight. For simplification of control logic, LEDs of the same color from each of the eight light modules 12 may be connected together at a single I/O port of the microcontroller. Thus, in this embodiment, the circuit uses three ports of eight control lines each, for a total of twenty-four control lines, to individually control any of the three LEDs within any of eight individual modules 12. This level of control makes it possible to generate any color of the visible spectrum.

Ramp Patterns

In a further embodiment, a ramp pattern may be used to produce different colors from one or more light modules. One method of applying a ramp pattern initializes all of the one or more light modules 12 to the same points of the ramp pattern. Over time, the individual red, green and blue LEDs will ramp up and down, in unison, producing single, but changing, colors. Adding light modules 12 will increase the intensity of the light or will allow coverage of a greater area, but will not increase the number of colors visible at any single point in time.

Figure 10:
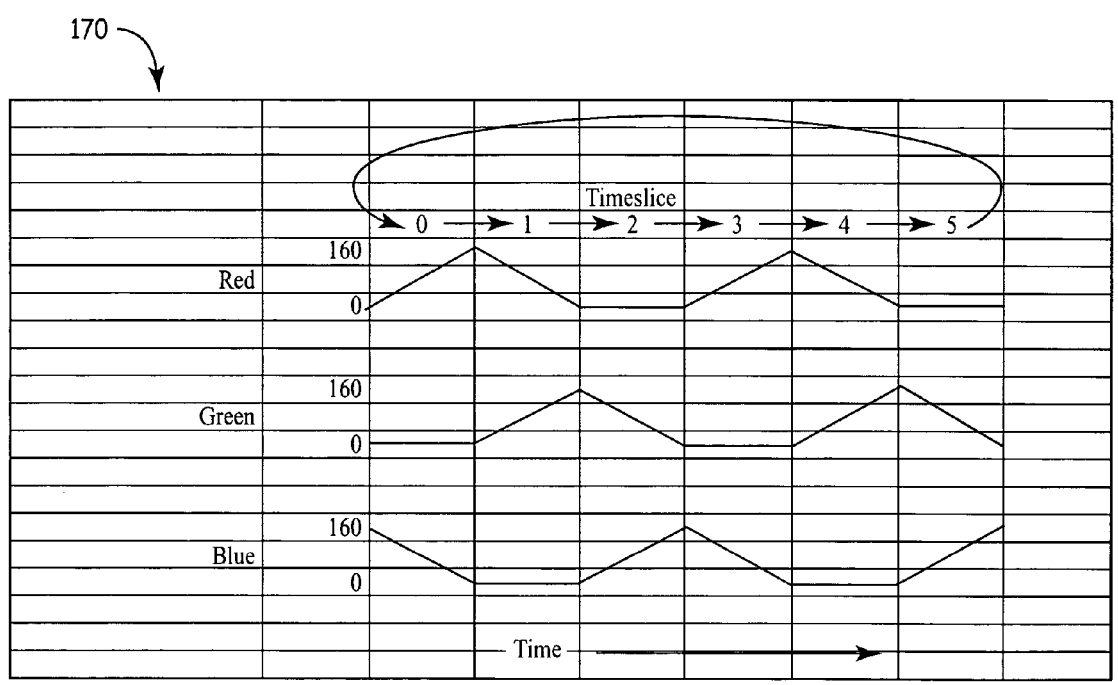
FIG. 10 is a diagram of a simple ramp pattern that may be used in accordance with the present invention.

A second exemplary method of using a ramp pattern 170, as illustrated in FIG. 10, applies to systems using two or more light modules 12. With this method, the two or more light modules 12 are initialized to different points on the ramp pattern. Even though the light modules 12 follow the same pattern, the color produced by one module will be specifically and intentionally different from other modules in the same system. For example, in a two module system, initializing a first light module 12 to the values at the beginning of Timeslice 0 of ramp pattern 170 produces the color blue since the values for the red and green LEDs are zero at this point on the curve. Initializing a second light module 12 to the values at the beginning of Timeslice 1 of ramp pattern 170 produces the color red since the values for the blue and green LEDs are zero at this point on the curve. At startup, the first light module 12 will begin changing from the color blue to the color purple and eventually to the color red while the second light module 12 changes from the color red to the color yellow and eventually to the color green. This method will allow any number of colors to be produced simultaneously, limited only by the number of individual light modules.

Cycling Patterns

Figure 11:
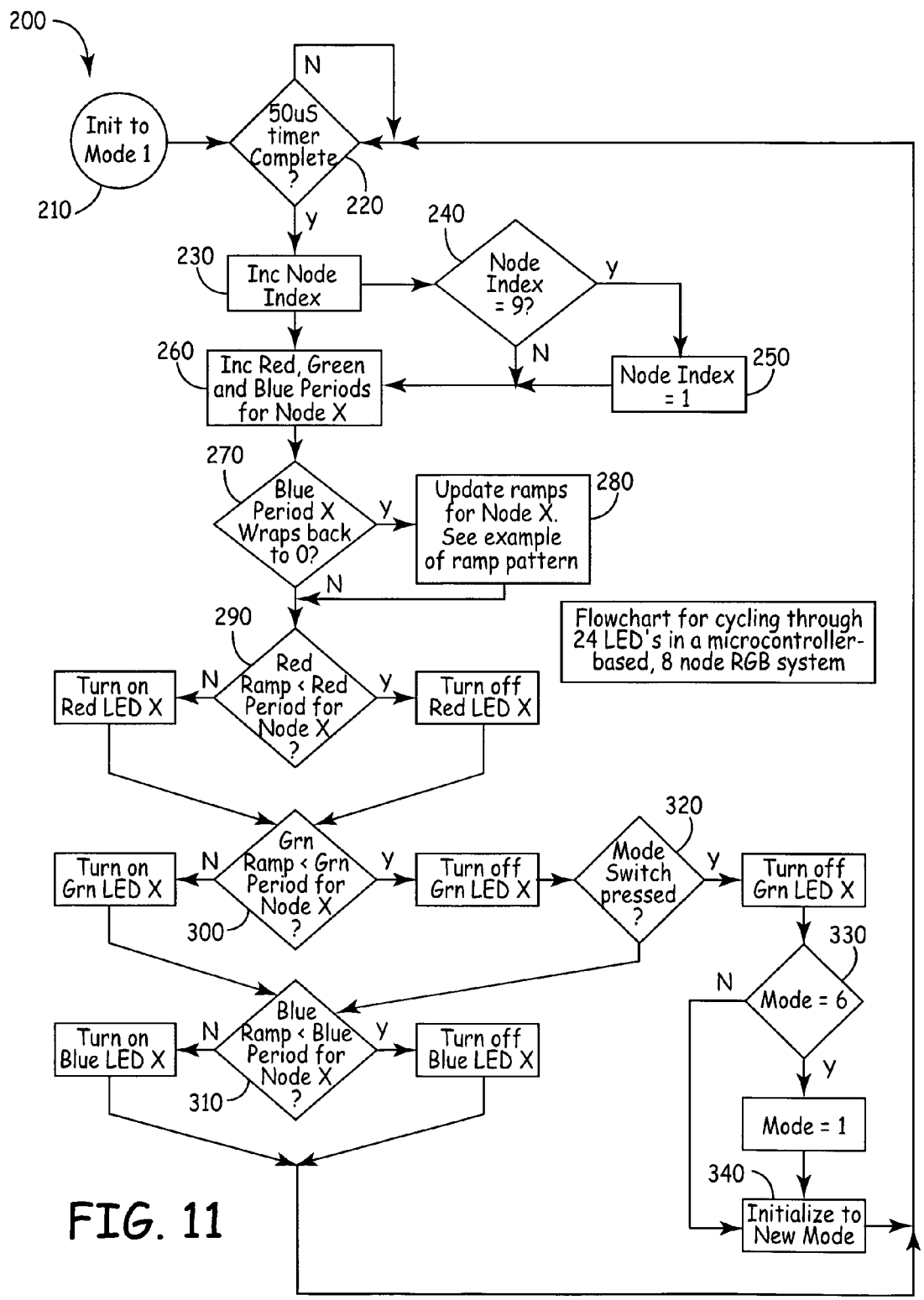
FIG. 11 is a flow chart of an exemplary embodiment of a method of cycling through the LEDs of the present invention.
Figure 12:
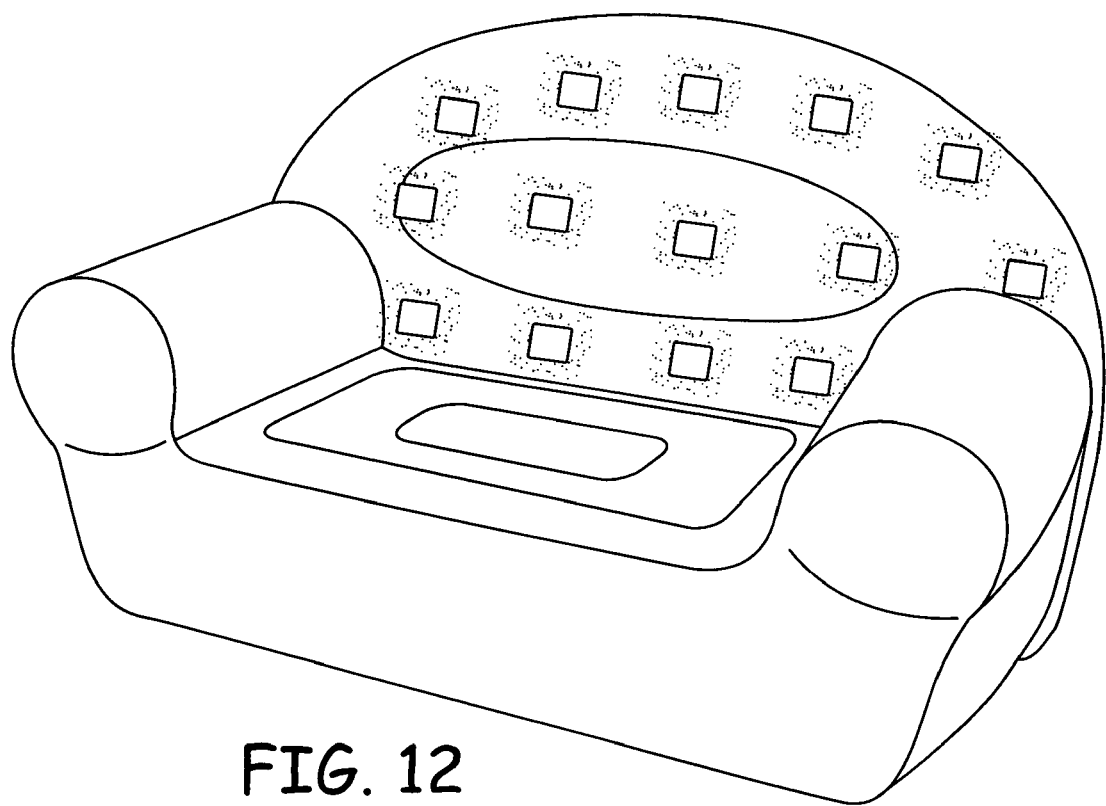
FIG. 12 is a perspective view of one embodiment of the lighting system of the present invention as used in an inflatable lounge chair.
Figure 13:
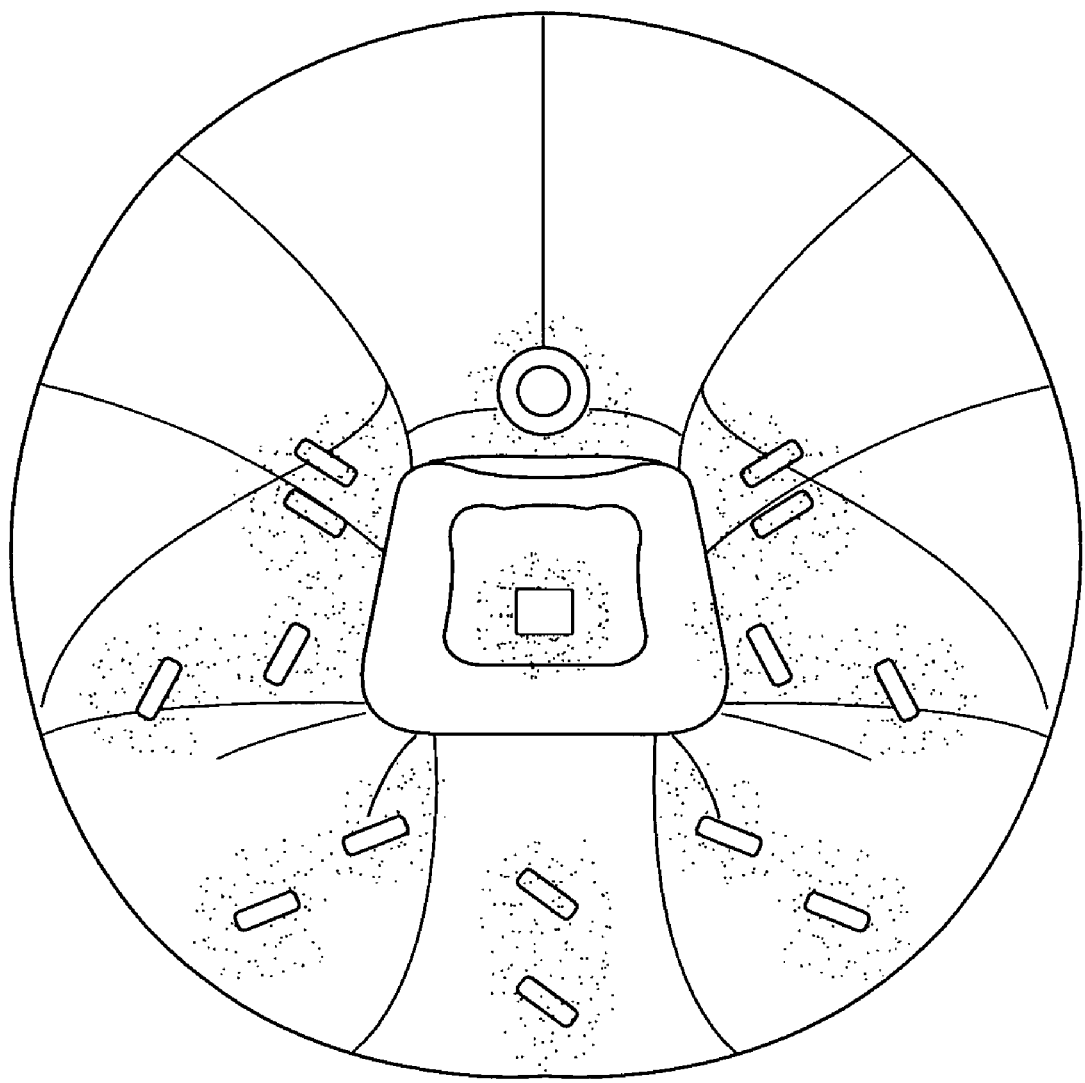
FIG. 13 is a perspective view of one embodiment of the lighting system of the present invention as used in an inflatable beanbag style chair.

FIG. 11 is a flow chart 200 of an exemplary embodiment of a method of cycling through all the LEDs in accordance with the present invention. At step 210, the system finishes initialization of the lighting system and moves to the first step of the cycle 220. Two sets of example initialization code are given in Appendix B of this application. One set of initialization code illustrates initial values for a "standard show." That is, a cycle during which all the light modules change in unison. The second set of initialization code illustrates initial values for a "rainbow show." That is, a cycle during which a rainbow wipe of colors is displayed. Typically, several "shows" or modes will be available to select from.

Once at step 220, the pulse width modulation period timer is checked. Once the timer has reached the end of the designated time period, the node index, indicating one of the eight light modules 12 in this example, is incremented [step 230]. If the node index reaches the value nine, or in other cases, a value that indicates that the value of the node index has gone beyond the number of light modules 12 in the system, the node index is reset to the value one [steps 240 and 250]. After incrementing the node index, the periods for each of the red, green and blue LEDs of the light module indicated by the node index are incremented [step 260].

In steps 270 and 280, it is determined whether the period for the blue LED should be reset back to zero. If that is the case, then the values for the LEDs of the light module indicated by the node index are updated to the initial values of a specified ramp pattern. That is, once a fixed time period has passed, the display pattern is reset to the initial values.

During steps 290, 300 and 310, it is determined, for each of the three LEDs (red, green and blue), whether the ramp value is less than the period value. Generally, it is determined whether the LED should be switched on or off. After these steps are completed, the pulse width modulation period timer is checked in step 220, and the process just discussed is repeated.

In a further embodiment, it may be possible to change the display pattern of the light modules 12. In such an embodiment, the mode switch is checked at step 320 to determine if a change has been made. If the mode switch was changed, the mode value is incremented or reset to one if the value incremented to is beyond the number of modes available [step 330]. The light modules are then set to the initialization values of the new mode selected [step 340] before repeating the process.

Lighting Configurations

In one embodiment, the apparatus 10 of the present invention is integrated into a pillow, as shown in FIG. 8, such that soft pillow material such as, for example, polyfill or other suitable material, surrounds the apparatus 10 in the pillow.

In other embodiments, the lighting system of the present invention may be used on or in furniture items to create a stimulating visual effect. For example, the lighting system may be used in inflatable furniture, such as shown in the lounge chair in FIG. 12 and the beanbag style chair in FIG. 13. Further examples include children's inflatable toys, inflatable pool toys and floating devices. The inflatable furniture is typically manufactured from PVC, Nitrile PVC ("NPVC") or vinyl. Alternatively, any suitable material may be used.

In one embodiment, as seen in FIG. 18B, sealed wand or tube 50 may be inserted in an inflatable piece of furniture 60 or other suitable object. As seen in FIG. 18B, the furniture 60 includes a pocket 65 defining a sleeve 70 or other opening for receiving tube 50. The sleeve 70 is sized to receive tube 50 when the furniture 60 is deflated. As the furniture 60 is inflated, the furniture material tightens around tube 50 thereby securely holding the tube in place without the need for adhesives. The power source 16 may be similarly inserted into a pocket and secured by the furniture 60 without adhesives.

Figure 14:
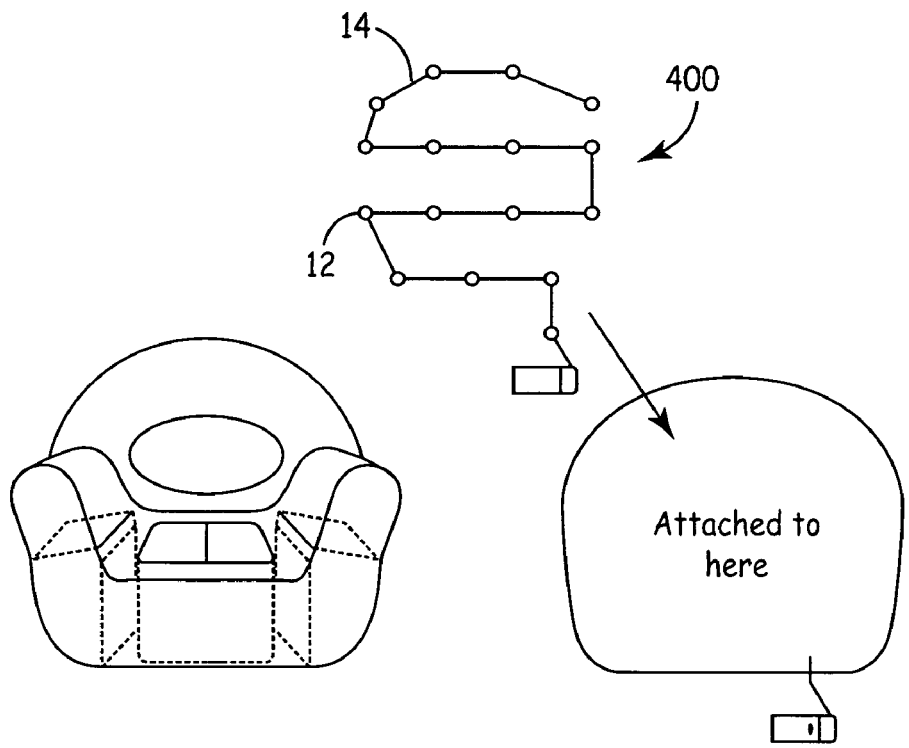
FIG. 14 is a schematic diagram of one means of attaching the lighting system of the present invention to furniture items.
Figure 14:
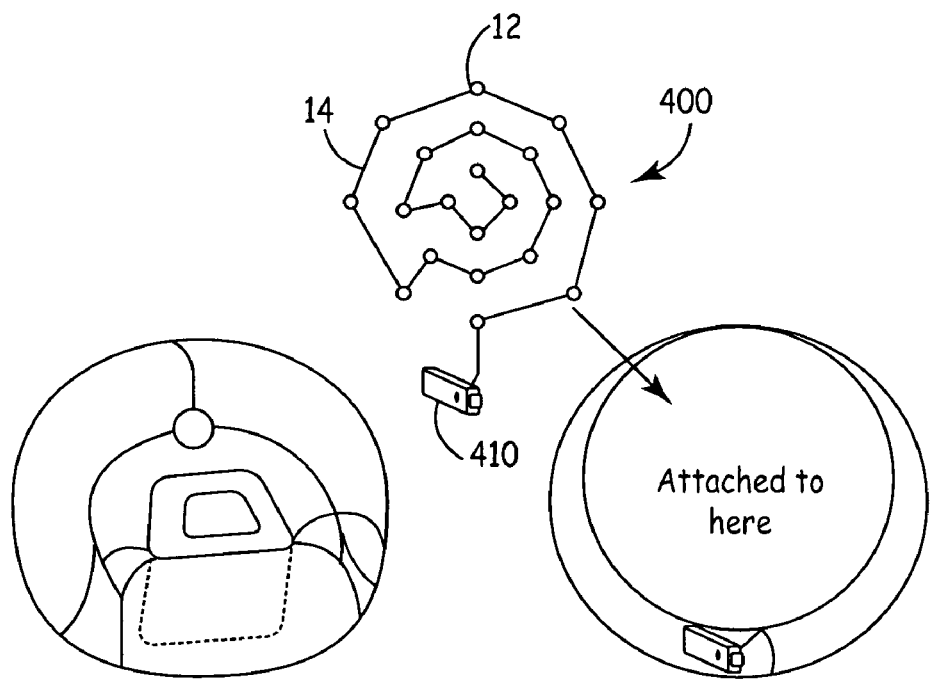
Figure 15:
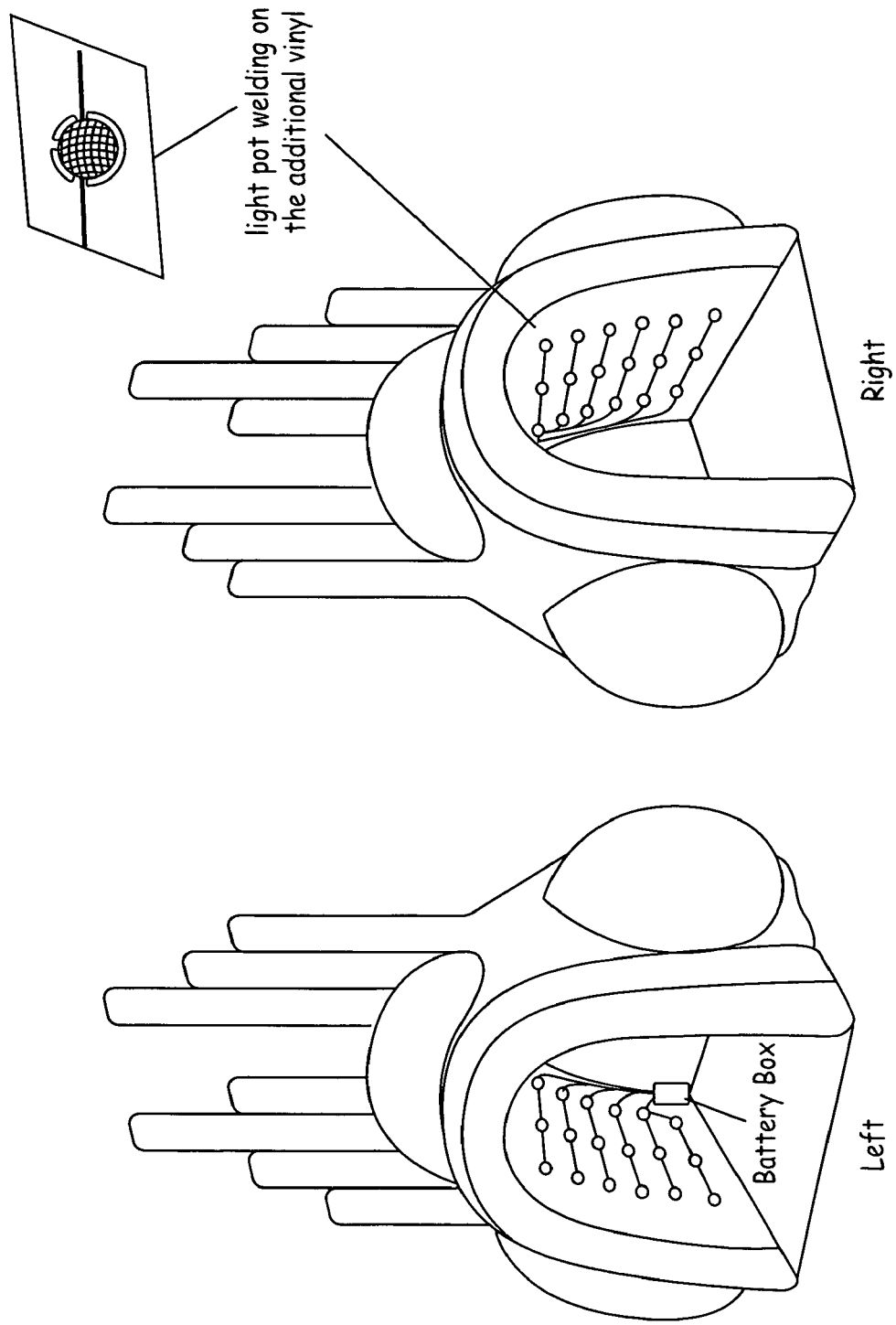
FIG. 15 is a schematic diagram of an alternative means of attaching the lighting system of the present invention to furniture items.
Figure 16:
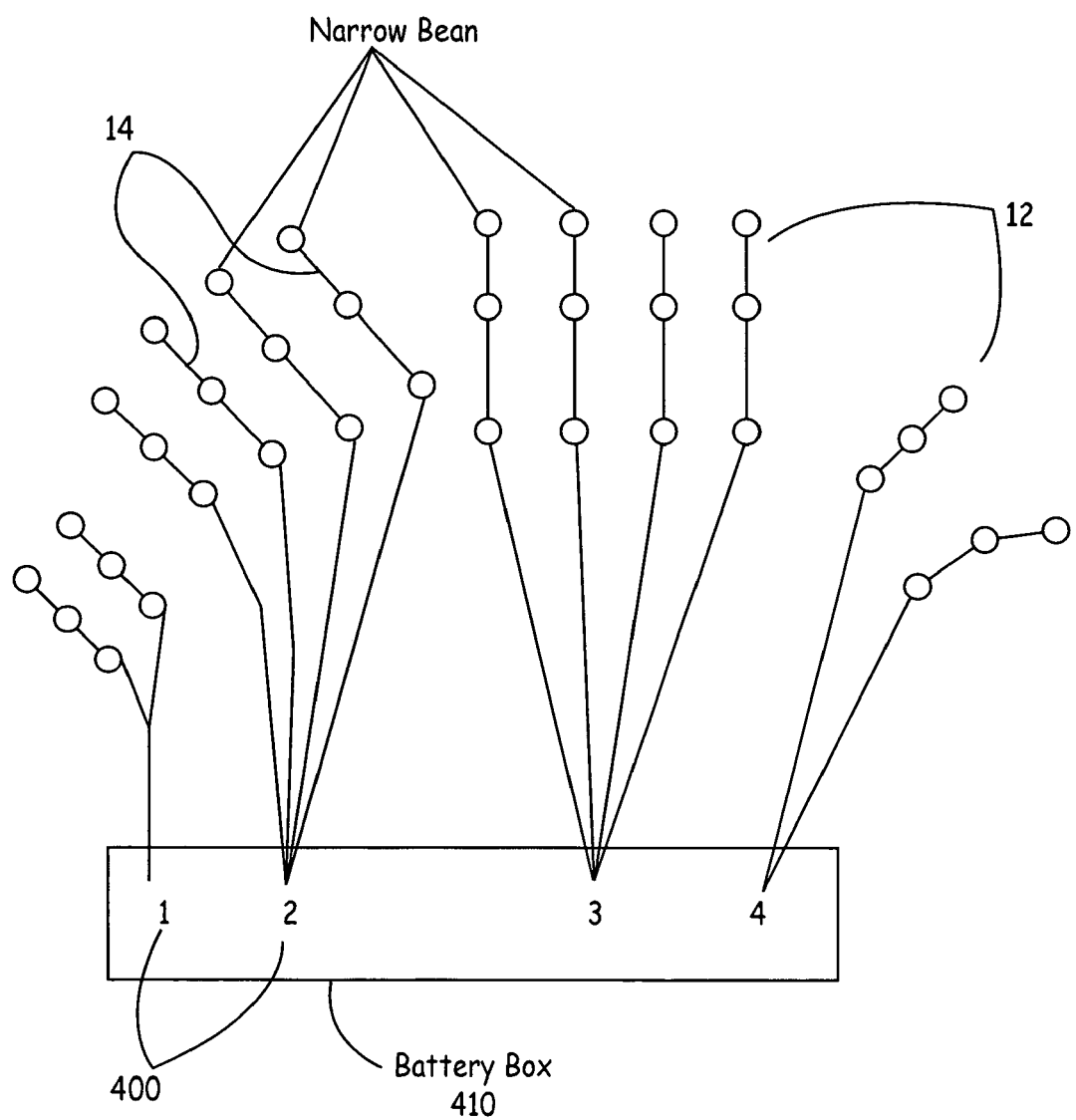
FIG. 16 is a schematic diagram of one embodiment of the present invention having multiple strings, or webs, of light modules.

Alternatively, the lighting system, including the wires 14 and lighting modules 12, may be attached to the furniture as shown in FIG. 14. Typically, the lighting system will consist of a preset string 400, or web, of lighting modules 12. As illustrated in FIG. 16, there may be multiple preset strings 400, or webs, of lighting modules 12 extending from the battery pack 410 and throughout the article of furniture. The lighting system, in one embodiment, may be integrated into the article of furniture by heat sealing the system beneath an overlying layer of PVC, NPVC, vinyl or other suitable material. Alternatively, other means of attachment may be used, such as gluing or welding the light modules to the article, as illustrated in FIG. 15.

Figure 17:
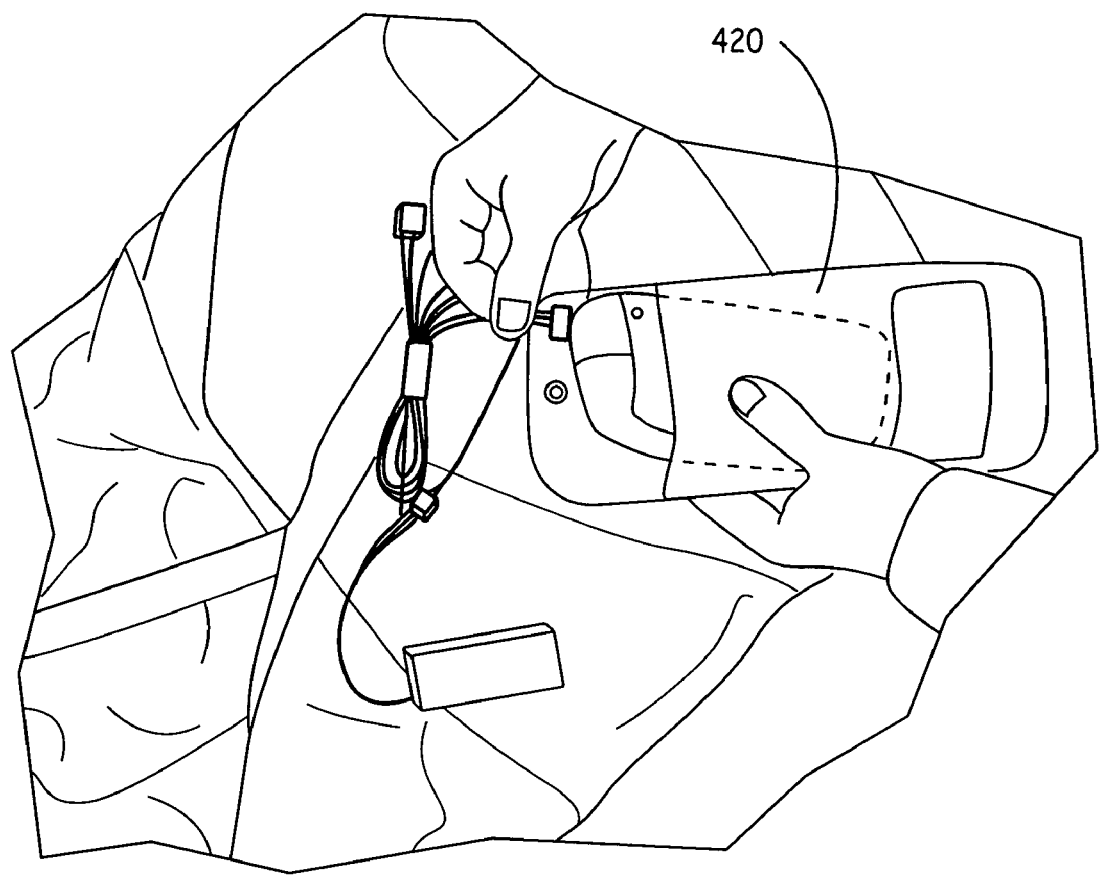
FIG. 17 is a perspective view of one embodiment of a storage compartment for the microcontroller and battery pack of the present invention that is attached to an article of furniture.

The battery pack 410 and microcontroller, in an exemplary embodiment, may be attached to the article of furniture by means of its own storage compartment 420, illustrated in FIG. 17. The storage compartment 420 may be made out of any suitable material, such as PVC, NPVC or vinyl, and may be attached to the article of furniture using any suitable attachment means, such as heat sealing, gluing, snapping, buttoning or any other means of fastening. Typically, the storage compartment 420 will be accessible by the user. Alternatively, the storage compartment 420 may be in a location that is not accessible, such as in one-time use items or disposable items.

The lighting system of the present invention may further be used in other items. For example, the lighting system may be used on or in articles of clothing, such as shirts, hats, jackets, etc. Similarly, the lighting system may be used in book bags, purses, briefcases, etc. Additionally, the lighting system may be used in toys, such as stuffed animals or balls and blocks of all shapes and types of material. The lighting system may be attached to such items by sewing the system into the material or gluing the system onto the material. Alternatively, any suitable means of attachment may be used to generally integrate or embed the lighting system to the fabric or item, including means of attachment previously mentioned.

Application for Extracting and Conveying AC Signal Information

Figure 19:
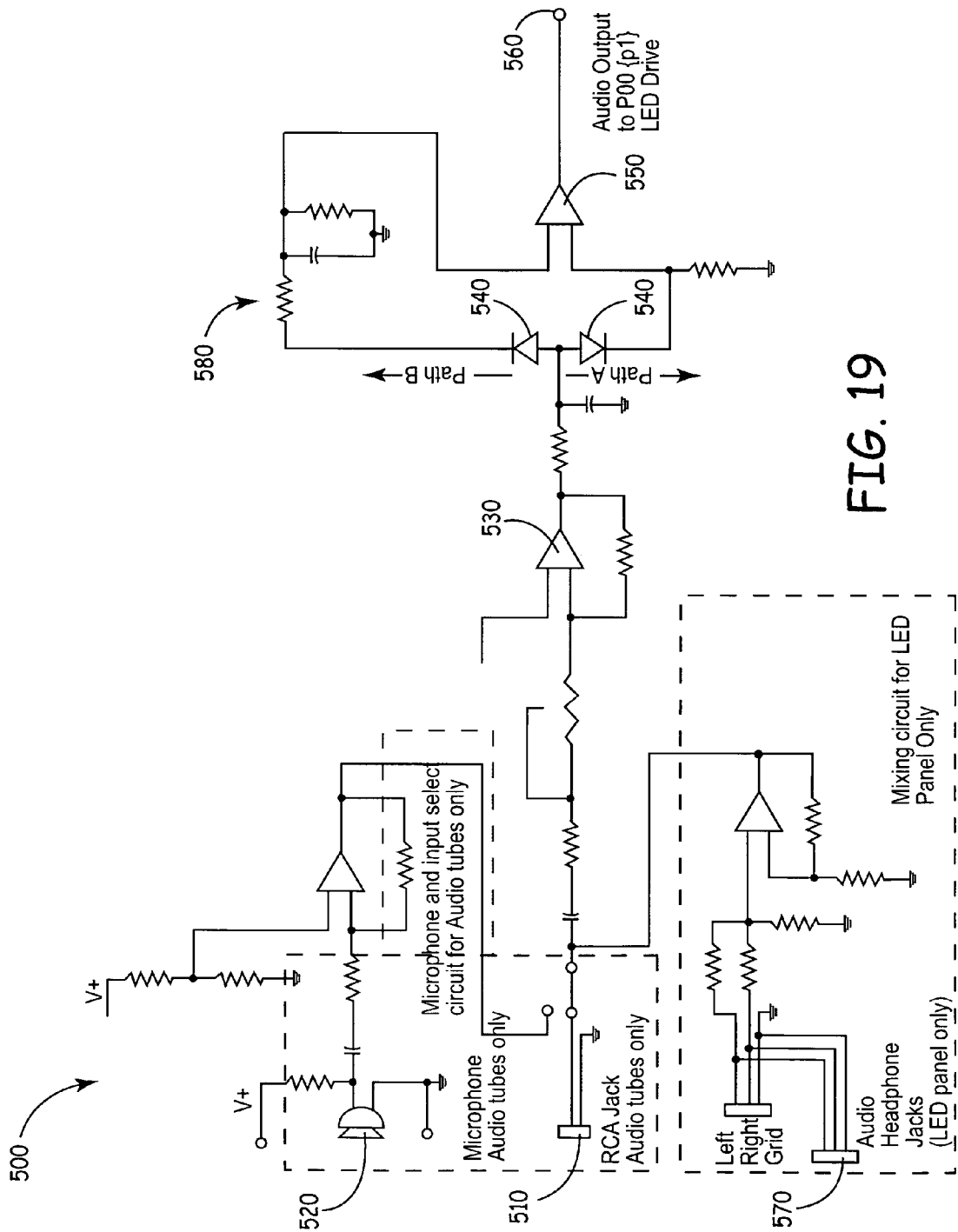
FIG. 19 is an interface circuit for extracting volume and frequency information from an audio signal in accordance with one embodiment of the present invention.

In another aspect of the present invention, a system and method are provided for extracting information from a modulated AC signal, such that the information may subsequently be communicated via a lighting system of the present invention. In one embodiment, a circuitry 500 is configured to receive and manipulate a modulated AC signal, as shown in FIG. 19. The circuitry 500 is electrically interfaced with the appropriate node of a microcontroller, such as microcontroller 120 shown in FIG. 9A. The microcontroller in turn causes a plurality of RGB light modules, such as module 12, to produce a lighting effect directly responsive to the aspects of the modulated AC signal that are measured by the circuitry 500.

In one embodiment, the modulated AC signal is a two-channel audio signal, whereby each channel is received by a separate circuitry 500. However, those skilled in the art will appreciate that a variety of audio, video, and other modulated AC signals may be received by circuitry 500 or a comparable configuration thereof. In the audio signal embodiment, circuitry 500 includes an audio jack 510 for accepting the signal, either single channeled or in stereo. Alternatively, the signal may be accepted by microphone 520. In this embodiment, each of the two channels (e.g., left channel and right channel) are received independently. Those skilled in the art will appreciate that an audio signal may include a single channel, or even 5, 6, 7, 8 or more channels, each of which may be received independently with a variation of the circuitry 500. Alternatively, the two channels may be mixed using an op amp as a summing amplifier (not shown), whereby the circuitry 500 only processes the mixed signal. Optionally, the audio signal may be fed back out via headphone jack 570.

Figure 20:
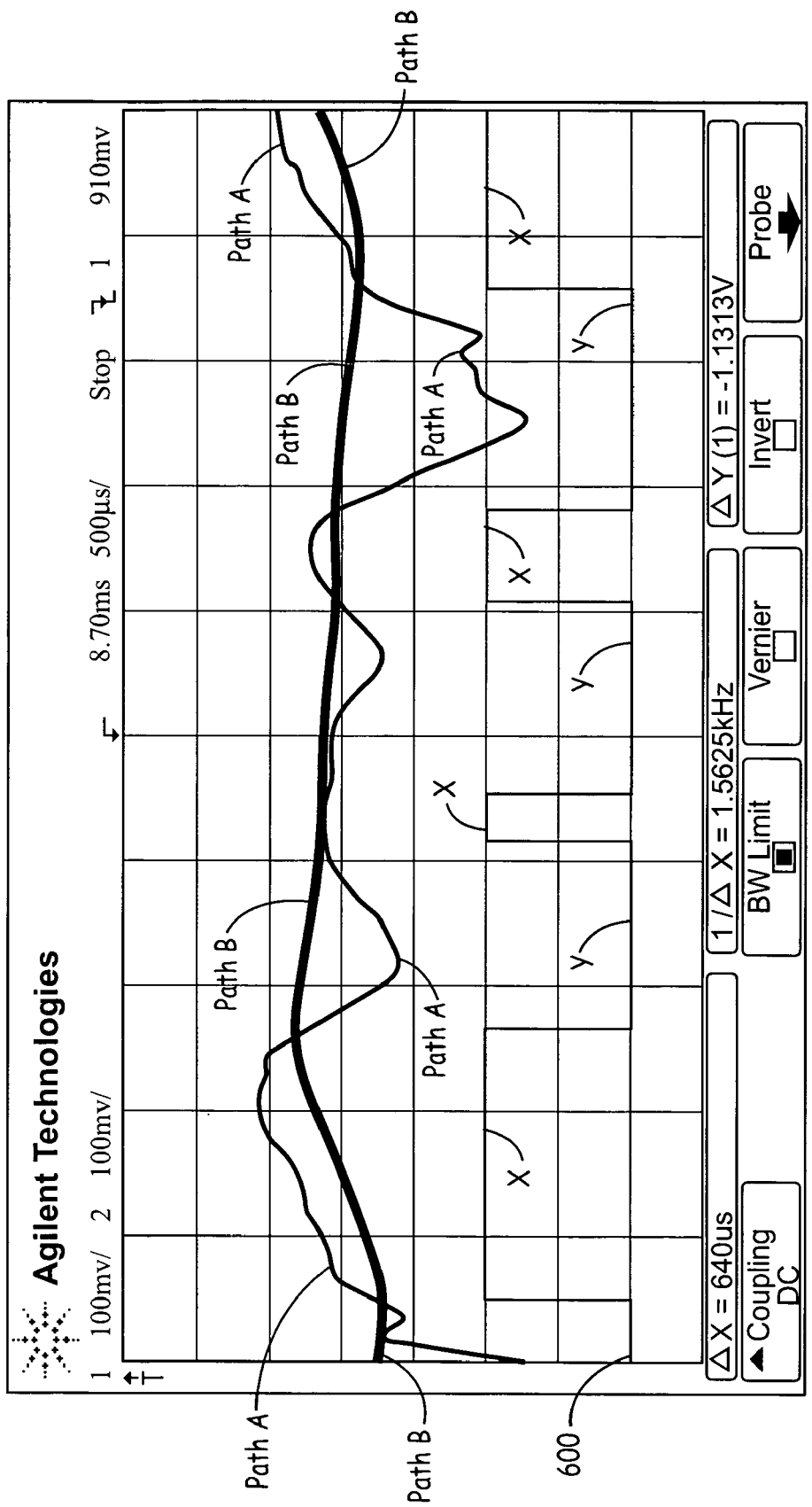
FIG. 20 is a graph displaying a representation of signal amplitude as a function of time.

After being received, the signal passes through an op amp 530 with a potentiometer for gain adjustment. Alternatively, the gain adjustment may be performed by a microcontroller (not shown). Subsequent to the op amp 530, the signal is split into two separate paths through a dual diode 540. As seen in FIG. 19, the portion of the audio signal passing through Path A remains substantially unchanged. In contrast, as seen in FIG. 19, the portion of the audio signal passing through Path B is sent through a low-pass filter 580. The low-pass filter may include a variety of known configurations. The filter 580, as seen in FIG. 19, includes two resistors and a capacitor. Low-pass filter 580 operates as a peak detector circuit, which "smoothes" the portion of the audio signal passing through Path B by removing the highest frequencies of the signal. The practical effect of the filtering results in the portion of the audio signal passing through Path B substantially tracking the trend of the incoming audio signal with the exception that the sharp transitions in the signal are smoothed out. This result is shown in FIG. 20. The low-pass filter operates for AC signal processing much like moving averages do in other fields such as finance. Both instruments create a smoother form of a signal which removes the short-term oscillations, leaving only the long-term trend. Although this embodiment implements a low-pass filter, alternative filters and filtering methods may be appropriate depending on the desired effect.

The effect of the filtering in Path B is measurable by sending the two signals (portion through Path A and portion through Path B) through a comparator circuit 550, such as an op amp, which compares two voltage signals and determines which one is greater. As seen in FIG. 20, the comparator output 600 signal from circuitry output 560 is responsive to the signals' volume and/or frequency and is decipherable by a microcontroller. Specifically, the periods during which the Path A signal's amplitude or volume is greater than the Path B signal's amplitude or volume, the comparator output yields a volume peak, seen at points X in FIG. 20. Conversely, the periods during which the Path A signal's amplitude or volume is less than the Path B signal's amplitude or volume, the comparator output yields a volume dip, seen at points Y in FIG. 20. The comparator output 600 is a digital signal, as seen in FIG. 20, whereby the signal is "on" or "1" during the volume peaks and the signal is "off" or "0" during the volume dips.

Filter 580 may be configured such that the portion of the audio signal passing through Path B is filtered to discern either higher frequency components or lower frequency components of the signal as desired, thereby allowing the circuitry 500 to extract frequency information by counting the number of pulses over time. By extracting a signal, such as amplitude or frequency information, from an audio signal as described above, the circuitry output 560 provides a signal that correlates to the original audio signal in a known manner. The outputted signal can then be conveyed or interpreted in a meaning manner.

In one embodiment, the circuitry output 560 is interfaced with a microcontroller for driving a lighting system, as described above, to achieve a desired lighting effect. For example, the present invention may provide a "graphic equalizer display" function, by conveying the outputted signal in a visual manner. The outputted signals corresponding to each of two audio channels may be used to drive a plurality of associated RGB nodes in a lighting configuration. Each of the plurality of associated RGB nodes, such as modules 12, contain three LED's. For example, each of the two graphic equalizer display lighting tubes 700, seen in FIGS. 21A and 21B, contain a plurality of linearly configured modules 12, which are driven by a microcontroller, as previously described, to achieve a graphic equalizing display effect.

Figure 21A:
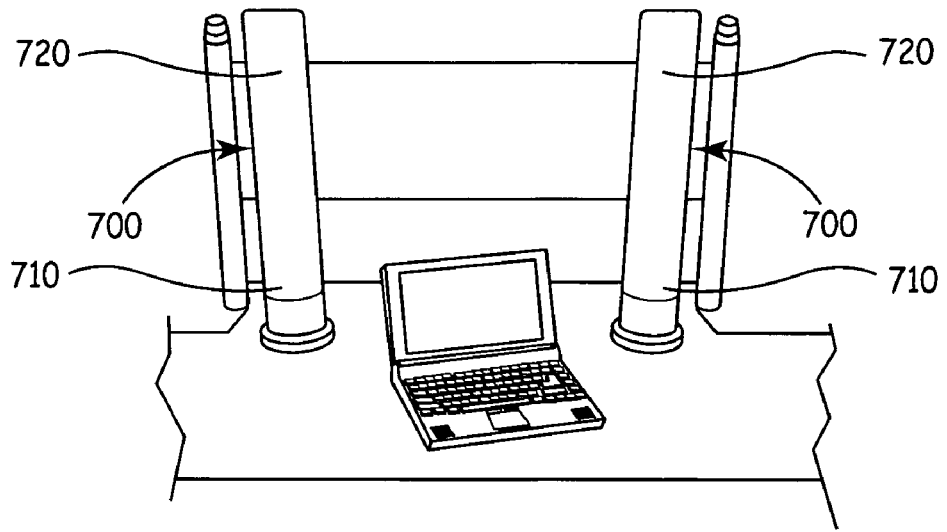
FIG. 21A is a perspective view of a pair of tubes, each housing associated RGB nodes in a lighting configuration.
Figure 21B:
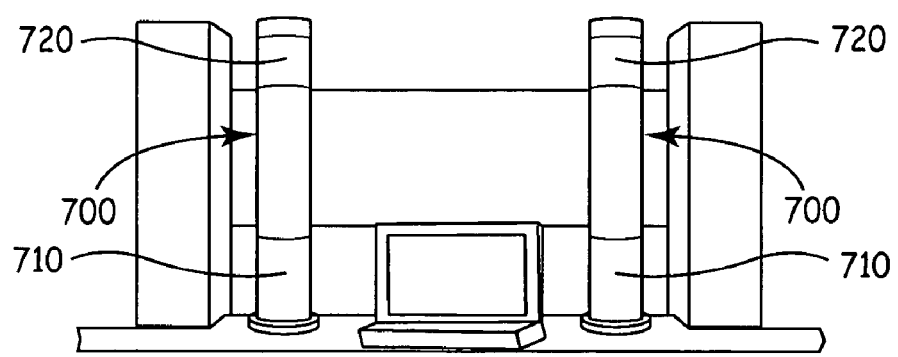
FIG. 21B is another perspective view of the pair of tubes housing associated RGB nodes of FIG. 21A.
Figure 21C:
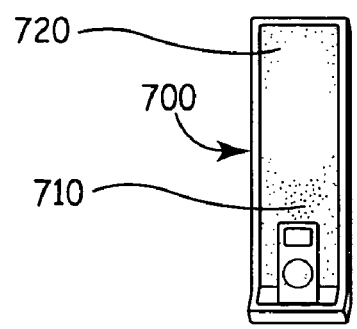
FIG. 21C is a perspective view of a tube housing associated RGB nodes in a lighting configuration.

Each of the two lighting tubes 700 shown in FIGS. 21A and 21B are provided to convey information about the two audio channels. As previously described, the two audio channels may alternatively be mixed using a summing amplifier, in which case the information about the mixed signal may be conveyed with a single lighting tube 700 as shown in FIG. 21C. Another example of a plurality of associated RGB nodes which are linearly configured relative to each other is tube 50, seen in FIG. 18A.

Returning now to FIG. 21A, the RGB modules 12 within tubes 700 are driven by a microcontroller receiving an audio signal as manipulated and outputted by circuitry 500. When there is no audio signal or the audio signal is substantially silent, all light modules 12 are driven to display a single color. In one embodiment, the "silent" color is blue, but other colors may be selected to represent silence. To achieve this effect, all of the blue LED's in the linear array of RGB nodes (modules 12) within tubes 700 are driven to full on and all of the red and green LED's within tubes 700 are driven to full off. FIG. 21A represents tubes 700 where the blue LED in the module at the lower portion 710 of the tubes 700 are illuminated (but not the red or green LED's), the blue LED in the module at the upper portion 720 of the tubes 700 are illuminated (but not the red or green LED's), and all the blue LED's in modules between the lower portion 710 and upper portion 720 of the tubes 700 are illuminated (but not the red or green LED's). The effect of driving each module to a single color produces a blue "background" color upon which subsequent audio changes are displayed.

As the audio signal exhibits increased amplitude (volume), the microcontroller receiving the manipulated audio signal from circuitry 500 drives the blue LED's in the lower portion 710 of the tubes 700 to full off, beginning with the module at the most lower portion 710 of the tubes 700 and linearly moving upward to higher modules. As a module's blue LED is driven to full off, the same module's red LED is substantially simultaneously driven to full on, shown in FIG. 21B. The blue LED's in the module or modules in the upper most portion 720 of the tubes remains illuminated until the audio signal's volume is sufficiently high and/or sustained for a sufficient period as described below. In this example, red is the "volume" color reflecting an extracted amplitude from the audio signal, but other colors may be selected to represent the amplitude of the audio signal.

This process produces the visual effect of a red bar of varying heights, directly responsive to the audio signal's amplitude (volume), appearing against a blue background. In this example, only two colors, red and blue, are used to create the effect. However, each of the plurality of modules 12 in the tubes 700 can create substantially any color. Therefore, utilizing red, green, and blue in different combinations allows any desired colors to be applied to the equalizer bar color (the "volume" color) and for the background color (the "silent" color). Additionally, the equalizer bar color and the background color may change with volume, change over time, or change based on other measurable characteristics of the audio signal, such as frequency. The visual effect may be installed or applied in a variety of applications, such as decorative objects, for example, speaker grills, wall hangings, panel-like displays, and any other functional or non-functional objects.

This configuration of the present invention conveys information relating to the duration of the volume peak or volume dip as described, rather than absolute volume information. By conveying visual information responsive to the duration of the period during which the volume is increasing, and the duration of the period during which volume is decreasing, a meaningful lighting effect is created. For example, while the audio signal's volume is increasing, the equalizer bar color (e.g., red) extends linearly upward through the linear array from lower portion 710 to upper portion 720. Conversely, while the audio signal's volume is decreasing, the equalizer bar color (e.g., red) linearly trends back downward from the upper portion 720 to the lower portion 710, leaving only the background color (e.g., blue), which is illuminated substantially simultaneously with the de-illumination of the equalizer bar color.

Optionally, a weighting scheme may be applied to the "graphic equalizer display" function whereby distinct weights are applied to amplitude increases and decreases. For example, the microcontroller that drives the tubes 700 may be configured to create an effect whereby the equalizer bar color moves upward responsive to volume increases more quickly than the bar color moves downward to volume decreases of the same magnitude. The microcontroller thereby allows volume increases to be visually represented by the equalizer bar color for a sufficient duration that they are perceptible and appreciable by a person viewing the equalizer bar. Because the LED's in the bar are driven to respond substantially simultaneously to volume changes, ensuring that the LED's do not respond so quickly to the audio signal so as to produce a flashing effect through this manner creates a more visually pleasing result.

Although the present invention has been described with reference to preferred embodiments, persons skilled in the art will recognize that changes may be made in form and detail without departing from the spirit and scope of the invention.

We claim:

1. An apparatus for extracting and interpreting information from an AC signal, comprising:
    a signal input for receiving at least one AC signal;
    an operational amplifier for receiving and outputting the AC signal;
    a dual diode configured to receive the AC signal and split the AC signal into two separate paths, the two separate paths including a baseline path and a filtering path, wherein the AC signal passing through the baseline path remains substantially unchanged and the AC signal passing through the filtering path passes through a low-pass filter;
    a comparator for comparing amplitudes of the AC signal from the baseline path and the AC signal from the filtering path, the comparator yielding a comparator output that is a binary state; and
    a microprocessor for receiving the comparator output and controlling a display, the display being configured to generate a visual indicia responsive to the comparator output.

2. The apparatus of claim 1 wherein the visual indicia includes a lighting apparatus, comprising
    a plurality of light modules, each light module comprising at least three lights, each light comprising a different color, wherein the plurality of light modules are driven by the microprocessor, and
    a housing for containing the plurality of light modules.

3. The apparatus of claim 1 wherein the housing is a substantially elongated compartment configured to encase the plurality of light modules, wherein the plurality of light modules are arranged substantially linearly within the housing.

4. The apparatus of claim 1 wherein the AC signal is an audio signal.

5. The apparatus of claim 4 wherein the amplitude is a volume of the audio signal.

6. The apparatus of claim 4 wherein the signal input is a microphone or an audio jack.

7. The apparatus of claim 1 wherein the AC signal is a video signal.

8. The apparatus of claim 7 wherein the amplitude is a luminance of the video signal.

9. A method of extracting and interpreting information from an AC signal, comprising:
    receiving at least one AC signal;
    modifying the AC signal through an operational amplifier;
    splitting the AC signal into two separate paths, the two separate paths including a baseline path and a filtering path, wherein the AC signal passing through the baseline path remains substantially unchanged and the AC signal passing through the filtering path passes through a low-pass filter;
    comparing amplitudes of the AC signal from the baseline path and the AC signal from the filtering path, thereby yielding a comparator output that is a binary state; and
    outputting the comparator output to a microprocessor, wherein the microprocessor is arranged to control a display, the display being configured to generate a visual indicia responsive to the comparator output.

10. The method of claim 9 wherein:
    the display includes a plurality of light modules, each light module comprising at least three lights; and
    the microprocessor controls the plurality of light modules to exhibit predetermined colors responsive to the comparator output.

* * * * *